US009222771B2

(12) United States Patent
Rosengaus et al.

(10) Patent No.: US 9,222,771 B2
(45) Date of Patent: Dec. 29, 2015

(54) ACQUISITION OF INFORMATION FOR A CONSTRUCTION SITE

(71) Applicant: KLA-Tencor Corporation, Milpitas, CA (US)

(72) Inventors: Eliezer Rosengaus, Palo Alto, CA (US); Ady Levy, Sunnyvale, CA (US); Kris Bhaskar, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 630 days.

(21) Appl. No.: 13/652,232

(22) Filed: Oct. 15, 2012

(65) Prior Publication Data
US 2013/0096873 A1    Apr. 18, 2013

Related U.S. Application Data

(60) Provisional application No. 61/547,907, filed on Oct. 17, 2011, provisional application No. 61/565,871, filed on Dec. 1, 2011, provisional application No. 61/591,398, filed on Jan. 27, 2012.

(51) Int. Cl.
*G01C 3/00* (2006.01)
*G01C 1/00* (2006.01)
*G01C 15/00* (2006.01)

(52) U.S. Cl.
CPC .................... *G01C 15/002* (2013.01)

(58) Field of Classification Search
CPC .... G01C 15/002; G01C 15/00; G01C 15/004; G01C 15/006; G01C 15/008; G01C 3/00; G01C 5/00; G01C 2009/066; G01B 11/0608; G01S 17/06; G01S 17/08; H04B 10/00
See application file for complete search history.

(56) References Cited

U.S. PATENT DOCUMENTS 5,091,627 A    2/1992 Kimura
5,471,218 A    11/1995 Talbot et al.
(Continued)

FOREIGN PATENT DOCUMENTS

EP    0717261    6/1996
EP    0813072    12/1997
(Continued)

OTHER PUBLICATIONS

International Preliminary Report on Patentability for PCT/US2012/060366 mailed May 1, 2014.
(Continued)

Primary Examiner — Manuel L Barbee
(74) Attorney, Agent, or Firm — Ann Marie Mewherter

(57) ABSTRACT

Systems and methods for acquiring information for a construction site are provided. One system includes a base unit positioned within a construction site by a user. A computer subsystem of the base unit determines a position of the base unit with respect to the construction site. The system also includes a measurement unit moved within the construction site by a user. The measurement unit includes one or more elements configured to interact with light in a known manner. An optical subsystem of the base unit directs light to the element(s) and detects the light after interacting with the element(s). The computer subsystem is configured to determine a position and pose of the measurement unit with respect to the base unit based on the detected light. The measurement unit includes a measurement device used by the measurement unit or the base unit to determine information for the construction site.

37 Claims, 12 Drawing Sheets

(56) References Cited

U.S. PATENT DOCUMENTS

| | | | |
|---|---|---|---|
| 5,510,977 A | 4/1996 | Raab | |
| 5,768,792 A | 6/1998 | Raab | |
| 5,771,978 A | 6/1998 | Davidson et al. | |
| 5,828,057 A | 10/1998 | Hertzman et al. | |
| 5,844,679 A | 12/1998 | Detweiler et al. | |
| 5,848,485 A | 12/1998 | Anderson et al. | |
| 5,978,748 A | 11/1999 | Raab | |
| 5,987,763 A | 11/1999 | Ammann et al. | |
| 6,014,109 A | 1/2000 | Raby | |
| 6,014,220 A * | 1/2000 | Kimura | 356/400 |
| 6,016,455 A | 1/2000 | Ohtomo et al. | |
| 6,023,326 A | 2/2000 | Katayama et al. | |
| 6,031,606 A | 2/2000 | Bayer et al. | |
| 6,034,722 A | 3/2000 | Viney et al. | |
| 6,046,800 A | 4/2000 | Ohtomo et al. | |
| 6,108,076 A | 8/2000 | Hanseder | |
| 6,121,598 A | 9/2000 | Green et al. | |
| 6,175,328 B1 | 1/2001 | Ericsson et al. | |
| 6,182,372 B1 | 2/2001 | Lamm | |
| 6,189,626 B1 | 2/2001 | Hanseder | |
| 6,243,658 B1 | 6/2001 | Raby | |
| 6,369,755 B1 | 4/2002 | Nichols et al. | |
| 6,381,006 B1 | 4/2002 | Ramstrom | |
| 6,396,571 B2 | 5/2002 | Ohtomo et al. | |
| 6,421,627 B1 | 7/2002 | Ericsson | |
| 6,427,780 B1 | 8/2002 | Kimura | |
| 6,473,166 B1 | 10/2002 | Ohishi et al. | |
| 6,473,716 B1 | 10/2002 | Ohishi et al. | |
| 6,563,574 B2 | 5/2003 | Ohtomo et al. | |
| 6,606,539 B2 | 8/2003 | Raab | |
| 6,633,256 B2 | 10/2003 | Zhdanov et al. | |
| 6,667,798 B1 | 12/2003 | Markendorf et al. | |
| 6,675,122 B1 | 1/2004 | Markendorf et al. | |
| 6,734,952 B2 | 5/2004 | Benz et al. | |
| 6,859,269 B2 | 2/2005 | Ohtomo et al. | |
| 6,868,359 B2 | 3/2005 | Raab | |
| 6,879,933 B2 | 4/2005 | Steffey et al. | |
| 7,006,084 B1 | 2/2006 | Buss et al. | |
| 7,079,234 B2 | 7/2006 | Vogel | |
| 7,130,035 B2 | 10/2006 | Ohtomo et al. | |
| 7,139,662 B2 | 11/2006 | Ericsson et al. | |
| 7,193,690 B2 | 3/2007 | Ossig et al. | |
| 7,193,695 B2 | 3/2007 | Sugiura | |
| 7,199,872 B2 * | 4/2007 | Van Cranenbroeck | 356/139.03 |
| 7,215,430 B2 | 5/2007 | Kacyra et al. | |
| 7,304,729 B2 | 12/2007 | Yasutomi et al. | |
| 7,312,862 B2 | 12/2007 | Zumbrunn et al. | |
| 7,319,511 B2 | 1/2008 | Murai et al. | |
| 7,321,420 B2 | 1/2008 | Yasutomi et al. | |
| 7,372,581 B2 | 5/2008 | Raab et al. | |
| 7,409,312 B2 | 8/2008 | Conner et al. | |
| 7,423,742 B2 | 9/2008 | Gatsios et al. | |
| 7,443,495 B2 | 10/2008 | Hertzman et al. | |
| 7,456,943 B1 | 11/2008 | Goad et al. | |
| 7,480,316 B2 | 1/2009 | Gachter et al. | |
| 7,515,256 B2 | 4/2009 | Ohtomo et al. | |
| 7,552,539 B2 | 6/2009 | Piekutowski | |
| 7,564,488 B2 | 7/2009 | Kumagai et al. | |
| 7,576,836 B2 | 8/2009 | Bridges | |
| 7,576,847 B2 | 8/2009 | Bridges | |
| 7,583,373 B2 | 9/2009 | Schwarz | |
| 7,583,375 B2 | 9/2009 | Cramer et al. | |
| 7,586,585 B2 | 9/2009 | Siercks | |
| 7,633,609 B2 | 12/2009 | Ohtomo et al. | |
| 7,633,610 B2 | 12/2009 | Walser | |
| 7,640,068 B2 | 12/2009 | Johnson et al. | |
| 7,643,955 B2 | 1/2010 | Weilenmann | |
| 7,646,339 B2 | 1/2010 | Green et al. | |
| 7,647,199 B2 | 1/2010 | Green et al. | |
| 7,679,727 B2 | 3/2010 | Benz et al. | |
| 7,697,581 B2 | 4/2010 | Walsh et al. | |
| 7,701,558 B2 | 4/2010 | Walsh et al. | |
| 7,701,559 B2 | 4/2010 | Bridges et al. | |
| 7,701,566 B2 | 4/2010 | Kumagai et al. | |
| 7,720,703 B1 | 5/2010 | Broughton | |
| 7,728,963 B2 | 6/2010 | Kirschner | |
| 7,739,803 B2 | 6/2010 | Yahagi et al. | |
| 7,742,176 B2 | 6/2010 | Braunecker et al. | |
| 7,764,809 B2 | 7/2010 | Ohtomo et al. | |
| 7,804,051 B2 | 9/2010 | Hingerling et al. | |
| 7,804,602 B2 | 9/2010 | Raab | |
| 7,812,933 B2 | 10/2010 | Jensen et al. | |
| 7,818,889 B2 | 10/2010 | Bernhard et al. | |
| 7,826,039 B2 | 11/2010 | Hinderling | |
| 7,830,501 B2 | 11/2010 | Kludas et al. | |
| 7,842,911 B2 | 11/2010 | Kirschner et al. | |
| 7,847,922 B2 | 12/2010 | Gittinger et al. | |
| 7,895,761 B2 | 3/2011 | Pettersson | |
| 7,916,279 B2 | 3/2011 | Shinozaki et al. | |
| 7,930,835 B2 | 4/2011 | Svanholm et al. | |
| 7,946,044 B2 | 5/2011 | Kludas et al. | |
| 7,966,739 B2 | 6/2011 | Kamizono et al. | |
| 7,978,128 B2 | 7/2011 | Scherzinger | |
| 7,982,665 B2 | 7/2011 | Kumagai et al. | |
| 7,982,859 B2 | 7/2011 | Hinderling et al. | |
| 7,982,866 B2 | 7/2011 | Vogel | |
| 7,990,397 B2 | 8/2011 | Bukowski et al. | |
| 7,990,550 B2 | 8/2011 | Aebischer et al. | |
| 7,999,921 B2 | 8/2011 | Herbst et al. | |
| 8,024,144 B2 | 9/2011 | Kludas et al. | |
| 8,031,332 B2 | 10/2011 | Miller et al. | |
| 8,036,452 B2 | 10/2011 | Pettersson et al. | |
| 8,040,528 B2 | 10/2011 | Carlen | |
| 8,042,056 B2 | 10/2011 | Wheeler et al. | |
| 8,077,913 B2 | 12/2011 | Euler | |
| 8,085,387 B2 | 12/2011 | Kludas et al. | |
| 8,087,176 B1 | 1/2012 | Hayes et al. | |
| 8,120,780 B2 | 2/2012 | Bridges et al. | |
| 8,125,629 B2 | 2/2012 | Dold et al. | |
| 8,149,388 B2 | 4/2012 | Kludas | |
| 8,184,267 B2 | 5/2012 | Kumagai et al. | |
| 2008/0247758 A1 | 10/2008 | Nichols | |
| 2009/0284593 A1 | 11/2009 | Dubois et al. | |

FOREIGN PATENT DOCUMENTS

| | | |
|---|---|---|
| EP | 0919831 | 6/1999 |
| EP | 1503176 | 2/2005 |
| EP | 1519146 | 3/2005 |
| EP | 1607718 | 12/2005 |
| EP | 1664841 | 6/2006 |
| EP | 1836455 | 9/2007 |
| EP | 1876416 | 1/2008 |
| EP | 1971822 | 9/2008 |
| EP | 1992960 | 11/2008 |
| EP | 2105705 | 9/2009 |
| EP | 2141450 | 1/2010 |
| EP | 2142884 | 1/2010 |
| EP | 2142939 | 1/2010 |
| EP | 2187166 | 5/2010 |
| EP | 2201330 | 6/2010 |
| EP | 1466136 | 8/2010 |
| EP | 2237071 | 10/2010 |
| EP | 2247923 | 11/2010 |
| EP | 1407291 | 12/2010 |
| EP | 2260323 | 12/2010 |
| EP | 2275778 | 1/2011 |
| EP | 1759172 | 6/2011 |
| EP | 2353028 | 8/2011 |
| EP | 2359091 | 8/2011 |
| EP | 2381269 | 10/2011 |
| EP | 2396623 | 12/2011 |
| EP | 2404137 | 1/2012 |
| EP | 2446299 | 5/2012 |
| EP | 2446300 | 5/2012 |
| EP | 2453205 | 5/2012 |
| EP | 2458327 | 5/2012 |
| EP | 2458328 | 5/2012 |
| WO | 01/09643 | 2/2001 |
| WO | 02/084327 | 10/2002 |
| WO | 2006/136557 | 12/2006 |
| WO | 2008/089792 | 7/2008 |
| WO | 2009/109202 | 9/2009 |
| WO | 2010/010552 | 1/2010 |

(56) References Cited

FOREIGN PATENT DOCUMENTS

| WO | 2010/047146 | 4/2010 |
|----|-------------|--------|
| WO | 2010/057169 | 8/2010 |
| WO | 2011/035290 | 5/2011 |
| WO | 2011/076907 | 6/2011 |
| WO | 2011/098127 | 8/2011 |
| WO | 2011/098131 | 8/2011 |
| WO | 2011/112277 | 9/2011 |
| WO | 2011/133731 | 10/2011 |
| WO | 2012/004341 | 1/2012 |
| WO | 2012/004342 | 1/2012 |
| WO | 2012/034813 | 3/2012 |

OTHER PUBLICATIONS

International Search Report and Written Opinion for PCT/US2012/060366 mailed Mar. 21, 2013.

\* cited by examiner

ACQUISITION OF INFORMATION FOR A CONSTRUCTION SITE

BACKGROUND OF THE INVENTION

1. Field of the Invention

This invention generally relates to systems and methods for acquiring information on a construction site.

2. Description of the Related Art

The following description and examples are not admitted to be prior art by virtue of their inclusion in this section.

Currently construction monitoring is mostly a manual process in which individual engineers are tasked with "walking the site" of a construction project periodically (e.g., daily) and producing reports that detail the status and progress of different construction tasks. Although the use of electronic design data such as building information models (BIMs) is becoming more common, there is usually not a tight coupling between the BIM and the progress reports.

Many systems and methods have been developed to generate information about a construction site. For example, light detection and ranging (LIDAR or LADAR) is an optical remote sensing technology that can measure the distance to, or other properties of, a target by illuminating the target with light, often using pulses from a laser. Point-cloud scanners (LIDAR) are available from multiple companies for use in construction sites. While such scanners can provide significant information about construction sites, they do have a number of disadvantages. For example, such scanners typically require setup (location determination) per observation point and generate very large point clouds that require offline and lengthy processing and incorporate sensitive and heavy optics that are not a good fit to a construction site. These limitations are inherent because these instruments acquire data without knowledge of their environment and of the desired measurements. As a result, it can be hard to extract objects of interest from a point cloud (e.g., due to too many points and/or blind acquisition). An alternative class of instruments are typically referred to as total stations. These, semi-manual LIDAR systems can also be used to measure objects of interest one point at a time. However, similarly to laser scanners, such systems typically require a lengthy set-up time and require a manual connection to the site BIM (if any). In addition, since they measure only one point at a time, the real accuracy of the object location or other measurements such as dimension is prone to errors.

Accordingly, it would be advantageous to develop methods and/or systems for acquiring information for a construction site that do not have one or more of the disadvantages described above.

SUMMARY OF TUE INVENTION

The following description of various embodiments is not to be construed in any way as limiting the subject matter of the appended claims.

One embodiment relates to a system configured to acquire information for a construction site. The system includes a base unit positioned within the construction site by a user. The base unit includes an optical subsystem and a computer subsystem. The computer subsystem is configured to determine a position of the base unit with respect to the construction site. The system also includes a measurement unit configured to be moved within the construction site by a user. The measurement unit includes one or more elements that are configured to interact with light in a known manner. The optical subsystem of the base unit is configured to direct light to the one or more elements and detect the light after interacting with the one or more elements. The computer subsystem of the base unit is configured to determine a position and pose of the measurement unit with respect to the base unit based on the detected light. The measurement unit includes a measurement device configured to be used by the measurement unit or the base unit to determine information for the construction site. The system may be further configured as described herein.

Another embodiment relates to a method for acquiring information for a construction site. The method includes determining a position of a base unit with respect to the construction site. The base unit is positioned within the construction site by a user. The base unit includes an optical subsystem and a computer subsystem. The method also includes directing light to one or more elements of a measurement unit using the optical subsystem of the base unit. The one or more elements interact with the light in a known manner. The measurement unit is moved within the construction site by a user. In addition, the method includes detecting the light after interacting with the one or more elements using the optical subsystem of the base unit. The method further includes determining a position and pose of the measurement unit with respect to the base unit based on the detected light using the computer subsystem of the base unit. The method also includes determining information for the construction site using a measurement device of the measurement unit.

The method described above may be performed as described further herein. In addition, the method described above may include any other step(s) of any other method(s) described herein. Furthermore, the method described above may be performed by any of the systems described herein.

BRIEF DESCRIPTION OF THE DRAWINGS

Other objects and advantages of the invention will become apparent upon reading the following detailed description and upon reference to the accompanying drawings in which.

Figure 1:
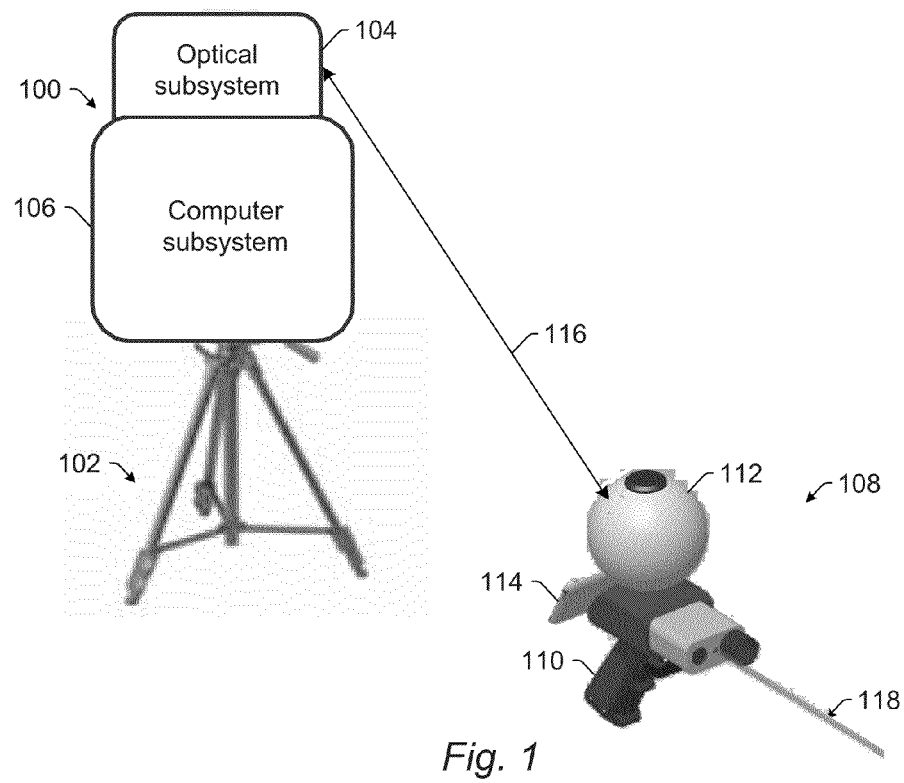
FIG. 1 is a schematic diagram illustrating a perspective view of one embodiment of a system configured to acquire information for a construction site.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein relate to a "system of systems" that can be used for quality check (QC) and progress monitoring (PM) at construction sites. For example, the systems described herein can be used to monitor progress of tasks being performed on a construction site. The systems are generally made up of combinations of sensors, actuators, algorithms, software, processors, and the like sufficient to manage the tasks of quality check and progress monitoring while reducing human intervention and associated costs. In addition, the embodiments described herein enable construction stakeholders such as builders, owners, inspectors, etc. to streamline and automate determining and monitoring the progress of construction. This automation can involve a tight coupling to design data (a building information model (BIM)) and metadata (building schedules, cost estimates, material specifications, etc.). The monitoring can be accomplished with a combination of portable and optionally fixed systems.

One embodiment relates to a system configured to acquire information for a construction site. A construction site generally includes construction elements that can have relatively complex geometries and can be positioned at widely varying positions within the construction site. Therefore, construction elements can be close or far away to any one point within the construction site. Construction elements can also be partially or completely occluded from any one point within the construction site. Construction elements also include indoor and outdoor elements. In addition, construction sites can be sunny or shaded, dry or wet, clear or dusted, clean or cluttered. Therefore, conditions within the construction site can vary wildly from location-to-location within the construction site and across time. As such, any construction monitoring, measurement, and/or inspection equipment needs to be mobile, robust, and easy to use.

Figure 2:
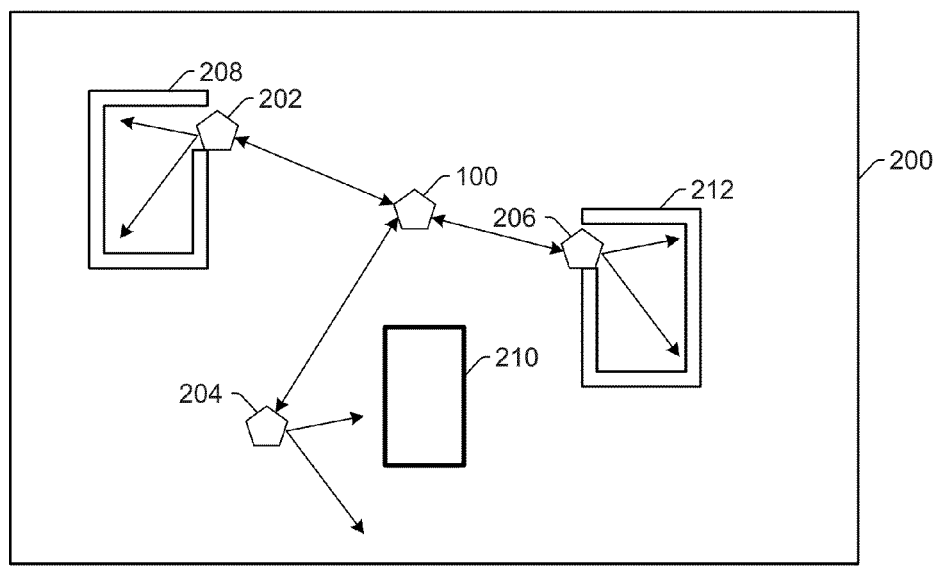
FIG. 2 is a schematic diagram illustrating a plan view of one embodiment of a system configured to acquire information for a construction site.

The system includes a base unit positioned within the construction site by a user. For example, as shown in FIG. 2, base unit 100 may be positioned within construction site 200 by a user. The base unit may be light enough that the user can carry the base unit to different positions within the construction site. In this manner, the base unit may be portable. For example, construction sites may be difficult to traverse due to lack of access to structures (e.g., stairs). Therefore, maximally portable systems are desired that make it relatively easy for users to move within a construction site without carrying heavy loads.

The base unit may also be configured such that the base unit can maintain a relatively stable position within the construction site once it has been positioned in the construction site by the user. For example, the portability of the base unit should be balanced with time and stability requirements of the subsystems used (e.g., it is not reasonable to expect a human to hold an object immobile for seconds with mm accuracy). This can be improved with stabilizers, but at an additional weight. For example, as shown in FIG. 1, base unit 100 may include tripod 102 that supports other elements of the base unit. The tripod may include any suitable tripod known in the art and may be replaced by any other suitable structure, mechanical device, robotic device, etc. The base unit may be positioned internal to the construction site rather than external to the construction site (such as on a crane or a neighboring building) because a global view provided by such a positioned base unit may be insufficient due to the occlusion of many constructions elements within the construction site from the base unit.

The base unit includes an optical subsystem and a computer subsystem. For example, as shown in FIG. 1, base unit 100 includes optical subsystem 104 and computer subsystem 106. The computer subsystem is configured to determine a position of the base unit with respect to the construction site. As described further herein, the base unit may include one or more position measurement systems such as point or scanning ranging devices, GPS, ultra wide band (UMB) locators, radio locators, inertial navigation units, optical trilateration systems, optical triangulation systems, and radio frequency identification (RFID) "smart" tags. The base unit may also include one or more attitude measurement systems such as encoders, levels (accelerometers), gyroscopes, and compasses (magnetometers). The term "attitude" is used interchangeably herein with the terms "pose" and "orientation" and generally refers to information about the direction of the point of view of the base unit. In other words, the "attitude," "pose," or "orientation" of the base unit generally refers to the direction in which the base unit is pointing or "looking." At a minimum, the base unit may include one or more calibrated imaging cameras and may also have georeferencing devices (GPS, UWB) and ranging systems.

A design for the construction site may include any suitable data, information, images, model(s), etc. stored in any suitable non-transitory computer-readable medium. Such a design may be commonly referred to as a BIM. A BIM is generally used in larger construction projects and includes the 3D design of the construction site. In any instances herein in which the term "BIM" is used, it is meant to refer to any suitable design or related data known in the art. A database describing the RIM may be available in a central location. Full or partial copies of the BIM may be copied to local fixed stations such as the base unit or a computer system at the construction site. The BIM and its copies may include the construction schedule, costs, materials specifications, etc.

There are important challenges in designing a QC/PM system for construction. A basic one is the fact that design databases (BIMs) are intended for architectural design and do not necessarily contain any details about the internal structure of objects and/or the sequence used to build them. For example, a dry-wall partition will typically be built by erecting studs (wood or metal) with a spacing that is not tightly controlled. One side of the partition may be then covered by drywall while on the other side insulation may be inserted before covering it with drywall as well. The BIM will in all likelihood contain only the geometric envelope of the partition, with no details about the stud positioning, drywall layers, and/or insulation properties (e.g., paper faced, type of insulation (rigid or bat), etc.). The partition will look wildly different at different points in time, and it may be impossible to predict whether the insulation is to be installed before or after one drywall layer.

The challenge from a computer vision (CV) standpoint in handling such cases is that a system has to be able to identify the components and use internal knowledge about material properties (e.g., drywall thickness) to be able to estimate whether the positioning of the objects is correct (for a QA function). This is particularly troublesome if the system is designed to infer the actual position of the sensors (cameras, three-dimensional (3D) ranging equipment, etc.) from the BIM. Furthermore, there is possibly a circularity problem in using the BIM for fine registration of the system and then using that registration to measure the position of objects described in the BIM. White relative measurements (e.g., distance between two walls) may be performed, absolute positioning (e.g., the position of a partition relative to established control points) may be difficult to accomplish.

Two approaches are described herein: the first one uses the BIM extensively to estimate the base unit position, while the second one involves little interaction with the actual BIM objects to determine sensor location.

In one embodiment, the computer subsystem of the base unit is configured to determine the position of the base unit with respect to the construction site by determining a position of the base unit with respect to a design for the construction site. In this manner, the computer subsystem may register the base unit position against the BIM and therefore to the construction site using prior knowledge (design data) from the BIM. Any BIM that is acquired and/or built for registration of the base unit may be maintained for later registration (e.g., of the base unit after its position has been altered intentionally by the user).

In some such embodiments, the position of the base unit with respect to the construction site may be determined by matching a 3D point cloud to the BIM. For example, the base unit may include an omnidirectional ranging device. The system may prompt the user to indicate approximate location (e.g., the room the base unit is in) or other tags may be placed in each room to automatically indicate this information. Based purely on the ranging data, a 3D point cloud-to-BIM matching can be performed using an Iterative Closest Point (ICP) algorithm. One concern in such situations is that the information in the BIM may be the end-state of the construction, so partial building of objects (e.g., walls) will increase the uncertainty in locating the base unit. It is possible that if enough points are used, a statistical "averaging" effect will still yield good estimates, but it is easy to build counterexamples such as: finish all partitions except one, where the inside drywall cover is not present (studs are visible, maybe insulation, etc.). In such situations, although the ICP may converge, it may do so to incorrect values because one of the walls is effectively translated by a wall thickness.

Determining the position of the base unit with respect to the BIM has a number of advantages such as that the registration may be performed as completely automated and comprehensive data collection. In addition, no new tasks must be added to the user workflow. The base unit can use massively redundant measurements (point clouds so outliers are unlikely to affect results. In addition, no visual information (such as cameras) is needed, except to locate details for actual measurements described further herein. However, determining the position of the base unit with respect to the RIM may yield incorrect or highly uncertain base unit positions in a number of cases. In addition, it may be difficult to achieve relatively consistent performance from one run to another if additional construction happened between observations. Furthermore, the position accuracy to do measurement work, particularly in early construction phases, may be insufficient.

In some embodiments, the computer subsystem is configured to determine the position of the base unit with respect to the construction site by using the optical subsystem of the base unit to identify two or more reference points having known positions within the construction site and determining the position of the base unit relative to the two or more reference points. For example, at the beginning of the construction process, reference points may be established and marked with one or more optical or electronic means (e.g., "monuments," UWB base stations, RFID, and optically identifiable labels). A variety of reference points may be used as described further herein.

The computer subsystem may determine desired points of view (POVs) for the base unit while rejecting temporary structures and clutter within the construction site. In one such embodiment, determining the position and/or attitude of the base unit with relatively high accuracy may include using approximate measurements (such as those that can be performed using relatively inexpensive inertial measurement units (IMUs), RFID, etc.) that can be used to get a good guess of position. Triangulation/trilateration to known objects may be used with cameras and LIDAR point sensors to refine the measurements.

In one embodiment, the two or more reference points include two or more tags positioned in the construction site by the user. For example, early in the construction process, there may be few cues available from images or ranging data to calculate sensor position. In the embodiments described herein, the system may use user-supplied "tags" as control points from which the base unit can calculate its position accurately. In this manner, the two or more reference points may include artificial markers that enable object detection for determining the position of the base unit with respect to the construction site. Such artificial markers may be located relatively sparsely throughout the construction site and can be used by the base unit or a measurement unit or measurement device described further herein to identify objects within the construction site for other purposes (e.g., to locate objects for measurements and/or for 3D image construction). In addition, "smart" markers or tags such as LIDAR "transponders" and RF-tagging for reference points may be used for imaging calibration.

At relatively early points in the construction of any level of a multi-storied building, there may be a simple rectangle plan. In such a situation, tags can be positioned at the corners of the plan, near the edges of the building. If the tags are close enough to the edges, chances of being able to determine an accurate, absolute location using UPS or Differential UPS are relatively good. If that is not possible, the tags can be located using a ranging device to survey monuments with known locations.

Figure 3:
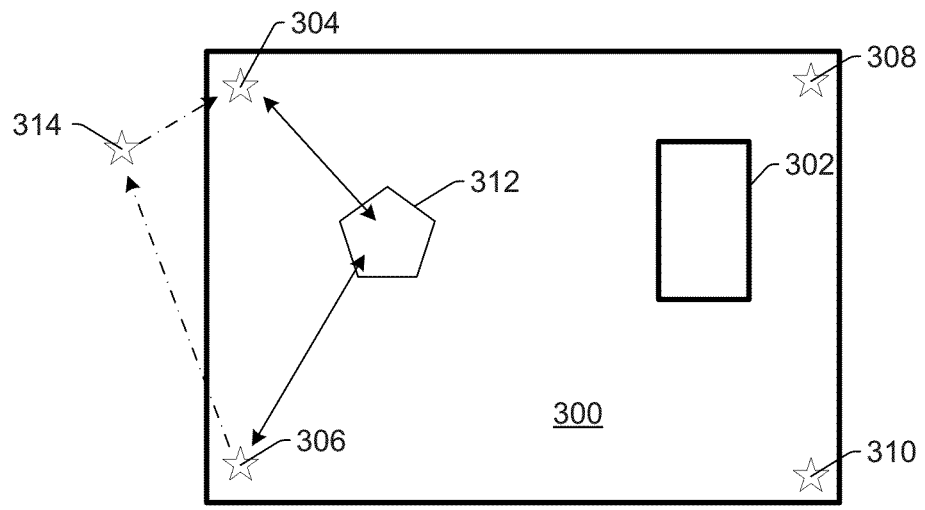
FIGS. 3-5 are schematic diagrams illustrating plan views of various embodiments of a base unit positioned within a construction site and two or more reference points having known positions within the construction site that can be used by the base unit to determine the position of the base unit with respect to the construction site.

In one such example, as shown in FIG. 3, the construction site may include rectangular-shaped floor 300 on which various construction elements may be built. As shown in FIG. 3, the construction site may include some construction elements such as elevator shaft 302. As further shown in FIG. 3, two or more tags 304, 306, 308, and 310 may be positioned at the corners of floor 300. If base unit 312 is positioned within the construction site as shown in FIG. 3, an obstacle (e.g., the elevator shaft) prevents the base unit from seeing tag 308 in the upper right hand corner of the drawing. However, if the XY location of the base unit is to be determined, it is sufficient for the base unit to have line of sight to two known tags such as tags 304 and 306. Clearly, redundant information such as the range to tag 310 may also be used. In any case, enough initial tags should be supplied to allow the base unit to see two of them from any location in the accessible area. The positions of each of the tags within the construction site may be determined with respect to another known position such as survey monument 314, which may have a known position relative to the overall construction site or the earth. Tags such as those described herein may also be attached to such survey monuments.

In another embodiment, the optical subsystem of the base unit includes a multi direction optical subsystem. For example, a base unit that includes an omnidirectional camera (or array of cameras in a circle) and a ranging device can determine its own position by finding the tags in an omnidirectional image and aiming the ranging device towards the tags to determine distance. The omnidirectional camera may be a single camera aimed at a mirror with a paraboloid of revolution shape (e.g., a SONY bloggie camera), an array of cameras positioned aiming radially outwards in a circle (e.g., point array cameras), a single camera mounted on a rotating platform driven by a motor (e.g., a stepper motor), and a line scan camera mounted on a rotating shaft. The ranging device may include a point scanner such as those commercially available from Leica, FARO, and Trimble, a ranging camera mounted on a rotating platform such as those commercially available from MESA AG, or an array of ranging cameras on a circle. In addition, the ranging device may include a vector ranging system that includes a laser illuminator (possibly modulated and/or with a relatively fast shutter), at least two mirrors (each mounted on rotating shafts, driven by motors or galvanometers), motor or galvanometer power drivers accepting commands from a computer to trace a particular path, a receiver (a photomultiplier (PMT) or solid state photodetector), an amplifier to condition the signal from the above sensor, a phase detector to recover the phase of the received light if using a modulated laser, a phase comparator to indicate the difference between the detected light's phase and that of the illuminated beam, and a narrow field, high magnification camera to permit accurate aiming of the single beam. The ranging device may also include an array of vector rangers as described above. Furthermore, the ranging device may include a range triangulation device (e.g., Microsoft Kinect or equivalent) or an array of triangulation devices. In addition, the ranging device may include a stereo camera to permit ranging calculation or an array of stereo cameras in a circle, aiming radially outward.

The system may be configured to identify the reference points and indicate them to the user. For example, the base unit may include a laser pointer that can be used to illuminate the locations in which the user is to affix the two or more tags. In addition, the two or more tags may be affixed to known positions to reposition POVs at a later time. In addition, POV planning for the base unit can include designing POVs to guarantee access to registration fiducials to fix base unit position with relatively high accuracy.

The two or more tags may include passive elements or active elements. For example, the two or more tags may include adhesive markers (fiducials) or adhesive RFID. In addition, a passive tag can be as simple as a printed sheet of paper with a machine readable identifier (e.g., a barcode, 3D matrix code, or optical character recognition (OCR) characters), and a fiducial marker of some sort (e.g., crosshairs, alternating white and block circle quadrants, etc.). This marker may have adhesive backing and perhaps a retroreflector (e.g., 3M tape at the center of the fiducial). The tag may also include an adhesive window that changes color if the paper tag is removed from its original position. The tag may also contain an adhesive backing to position it on a wall or ceiling surface (e.g., Post-it like). Active tags are more expensive, but they could be implemented with one or more of: a small microprocessor like Arduino (an open-source single-board microcontroller), TI CC430 (a microcontroller commercially available from Texas Instruments), Zigbee (a specification for a suite of high level communication protocols using small, low-power digital radios), or Berkeley MOTE (the first available open hardware/software research platform); an RF link (Zigbee, WiFi, Dash7 (an open source wireless sensor networking standard for wireless sensor networking), Bluetooth) to enable remote control/data acquisition; a power source (battery); an antenna; one or more light emitting diodes (LEDs) to be flashed on command; a motion sensor (accelerometer) to detect if the tag has been disturbed or moved; retro-reflective fiducial points; an inexpensive web camera; and GPS receivers to locate themselves with Differential GPS.

In another embodiment, the computer subsystem of the base unit is configured to modify the two or more reference points over time based on changes in the construction site. For example, if the location of the base unit is known, then an analysis of the BIM can determine that for future cases (e.g., when more partitions are built), new tag(s) should be added in certain positions within the construction site. For example, in the situation shown in FIG. 3, it may be determined that a new tag should be positioned on the elevator shaft as shown by tag 316 in FIG. 4. The base unit can then use a ranging laser to show the user where exactly to place the tag. After the user places the tag, the base unit can find the new tag and, by ranging, determine its coordinates. The new tag coordinates can then be recorded in a database for future use. This process may be generally referred to as "propagation."

Figure 4:
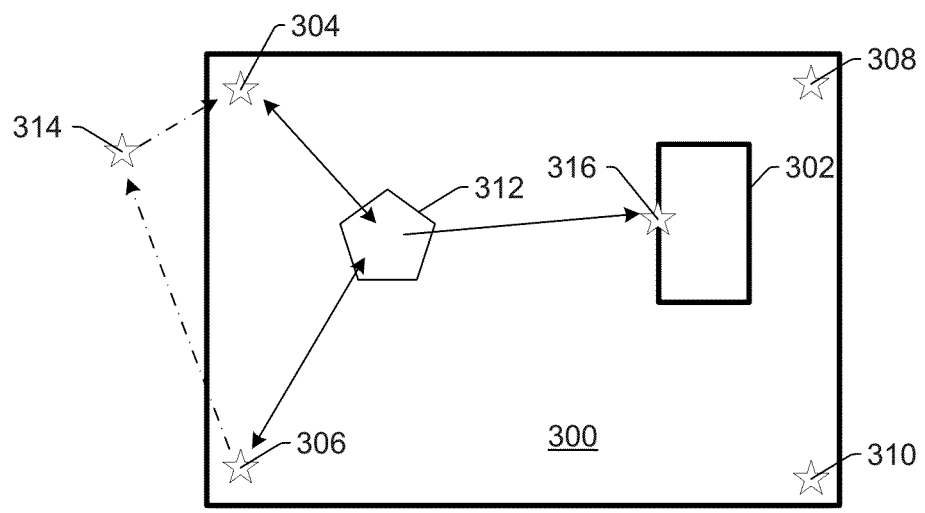
Figure 5:
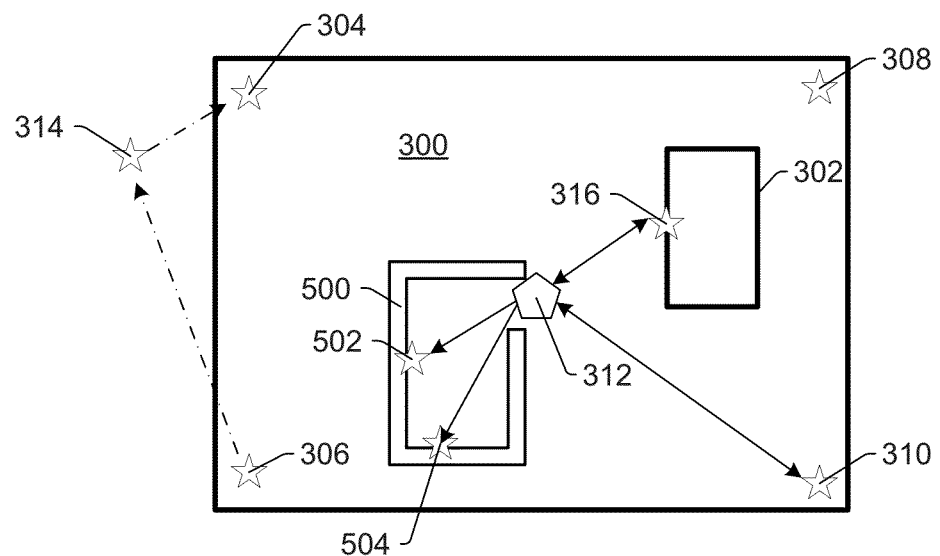

New partitions may be added to the construction sites shown in FIGS. 3 and 4 and a new room may be created. For example, as shown in FIG. 5, walls 500 of a room may be built within the construction site. The base unit may then guide the user to stand at the entrance of the room with line of sight to at least two tags external to the room and then suggest two new locations inside that room for tag propagation. For example, as shown in FIG. 5, the user may position base unit 312 within the entrance of the room defined by the opening in the walls. In such a position, the base unit may have a line of sight to tags 310 and 316 whose positions may have already been established as described above. The base unit may then determine that tags 502 and 504 should be positioned at certain locations within the room. The user may then affix the tags at the determined positions possibly with guidance from the base unit. Now, the base unit can locate itself accurately within that new room.

The tag propagation process described above can be continued as needed when new partitions are added. Clearly, as long as enough tags are present, the base unit does not need to refer to the BIM to determine its position. Furthermore, the base unit can now measure the position of any object within its accessible space just as it measured the position of a new tag. This enables the measurement functions described further herein to be performed. Other measurements (e.g., surface flatness, floor sloping, etc.) can be accomplished by measuring multiple points and fitting surfaces to them.

Using the tags as described above has a number of advantages. For example, minimal knowledge about the BIM internals is needed. In addition, no knowledge about construction sequence, materials, or internal layers is required. Furthermore, the process will work at any stage of construction so long as the tags remain visible. Using the tags does, however, require additional activities by the user (e.g., tag addition). In addition, the tags are vulnerable to tag removal or tag repositioning. However, tags that are capable of sensing motion and reporting it (e.g., "smart" tags) may be used. Furthermore, using the tags as described above, requires relatively high accuracy in locating and ranging to the tags. However, a telescopic camera may be included in the ranging device to allow closed loop positioning of the ranging beam, retro-reflectors may be added to the tags, and LED blinkers may be added to the tags to allow an omnidirectional camera to find the tags easily. Furthermore, there may be accumulated error pileup if propagation requires too many steps. The tags can be positioned on surfaces such as ceilings that will likely remain visible for a relatively long time. In addition, the error pileup can be minimized by developing optimized tag locations that require a minimum number of propagation "generations."

In one embodiment, the two or more reference points include fixed construction elements of the construction site. In this manner, the two or more reference points may include as-built artificial targets. For example, once robust, persistent feature points are built (e.g., the trihedral ceiling corners of a room), they can be used as tag substitutes for registration purposes although it may be convenient to retain at least one tag per "room" to allow the base unit to know approximate location quickly.

Determining the position of the base unit with respect to the RIM and with respect to two or more reference points are not, however, mutually exclusive schemes. For example, the system may use a hybrid of the two applications. In particular, determining the position of the base unit with respect to the BIM may be perfectly feasible and it is clearly easier on the user than using the two or more reference points. In addition, if the base unit includes ranging instruments designed to allow omnidirectional ranging, then using two or more reference tags may be possible and the hardware may be a superset of what is required for determining the position of the base unit with respect to the BIM.

Regardless of whether the registration of the base unit is performed against the BIM, surveyed points outside the construction site, or control points on the construction site, a virtual grid may be established on a construction site. For example, a virtual grid may be established within a construction site using control points that may be determined by a surveying team and marked. In addition, grid lines within the virtual grid may be marked using chalk or strings. Communication using WiFi or similar networking may be performed by instruments such as the base unit that want to get their positions versus the site grid lines. In addition, one or more units or instruments may measure their position (x, y, z position and/or pose) using an optical reading unit.

Any of the base units described above may include any combination of the above-described elements possibly in combination with one or more other elements. For example, the base unit may include one or more high resolution cameras, possibly with zooming or high magnification lenses, mounted on pan and/or tilt devices (to permit two dimensional (2D) local image acquisition). The computer subsystem of the base unit may also coordinate system operation. In addition, the base unit may include a user interface to interact with the user. Furthermore, the base unit may include a portable power supply (such as a battery), active illumination sources (floodlights, LEDs, etc.), orientation sensors (such as magnetometers and accelerometers) to deduce system orientation and/or provide image stabilization and navigation capability, and RF location devices (GPS, Differential GPS, Local GPS such as the technology commercially available from Locata Corp., Australia, UWB, RFID, Bluetooth, (e.g., WiFi timing to fixed base stations), etc.), inertial navigation (accelerometers, gyrometers, motion integration), a magnetic compass (yaw), pitch and/or roll accelerometers to augment or replace line of sight location, or some combination thereof. Therefore, there are multiple options for a position aware imaging system such as Differential GPS as a primary positioning system with WiFi or inertial navigation as a fallback.

The system also includes a measurement unit configured to be moved within the construction site by a user. The measurement unit may include a number of different measurement devices, sensors, etc. as described herein based on the application in which the system is to be used. The measurement unit may be light enough that the measurement unit can be moved within the construction site by a user and pointed at one or more construction elements within the construction site that are to be measured using the measurement unit. For example, as shown in FIG. 1, measurement unit 108 may include handheld unit 110 that can be moved easily by a user. The handheld unit may include a number of elements such as those described herein and may have various elements attached thereto such as element 112 and display device 114.

As shown in FIG. 2, the system may include two or more measurement units 202, 204, and 206. Each of the measurement units may be configured similarly or may be different. As shown in FIG. 2, each of the measurement units may be pointed at different construction elements within the construction site. For example, measurement unit 202 may be positioned towards the interior of partially or completely built room 208. Measurement unit 204 may be positioned with a line of sight towards elevator shaft 210 and the space to one side of the elevator shaft, and measurement unit 206 may be positioned towards the interior of partially or completely built room 212. In addition, instead of three different measurement units, one measurement unit can be used and can be sequentially moved to the positions of the measurement units shown in FIG. 2.

The computer subsystem of the base unit is configured to determine a position and pose of the measurement unit with respect to the base unit based on detected light. For example, the base unit that is registered as described above may be used to track a measurement unit in a construction site. In one embodiment, the position of the measurement unit with respect to the base unit includes a position of the measurement unit in 3D coordinates (e.g., Cartesian or spherical), and the pose of the measurement unit with respect to the base unit includes an orientation of a POV of the measurement unit. For example, the base unit may be configured to determine the position of the measurement unit in x, y, and z coordinates and to determine the orientation of the measurement unit versus the base unit with a relatively high accuracy e.g., within a millimeter) to any point on the measurement unit.

The base station can be a relatively tong distance away from the measurement unit. The measurement unit may also be referred to as a "satellite." The detected light may also be used in combination with information from the measurement unit to determine the position and/or pose of the measurement unit with respect to the base unit. In this manner, both the measurement and base unit data streams may be used in the determination of the measurement unit position and/or pose versus the base unit or versus the BIM. In addition, since the position of the base unit is determined with respect to the construction site, the position and/or pose of the measurement unit with respect to the base unit may be used to determine the position and/or pose of the measurement unit with respect to the construction site. Furthermore, since the position and/or pose of the base unit may be determined with respect to known markers, the position and/or pose of the measurement unit may be determined with respect to the same known markers (using triangulation or trilateration).

The measurement unit includes one or more elements that are configured to interact with light in a known manner. For example, the one or more elements may include physical elements attached to the measurement unit in a known manner, and the one or more elements may refract, diffract, scatter, transmit, reflect, or otherwise interact with the light from the base unit in a known manner. The one or more elements may be further configured as described herein.

The optical subsystem of the base unit is configured to direct light to the one or more elements and detect the light after interacting with the one or more elements. For example, as shown in FIG. 1, the optical subsystem may be configured to direct light 116 to element 112 of the measurement unit and to detect the light after it has interacted with element 112. In addition, as shown in FIG. 2, base unit 100 may have a line of sight to each of measurement units 202, 204, and 206 such that that the optical subsystem of the base unit can direct light to and detect light from the one or more elements of each of the measurement units. In such instances, the base unit can determine the position of any measurement unit that is within its line of sight. The optical subsystem of the base unit may include a vector scanner. The base unit tracking beam may, therefore, be used to report a distance measurement between the base unit and the measurement unit.

In one embodiment, the one or more elements of the measurement unit include one or more reflective or partially reflective elements. For example, the base unit may be configured to determine the position of the measurement unit based on a laser beam reflected from the measurement unit and one or more encoders internal to the base unit or the computer subsystem of the base unit.

Figure 6:
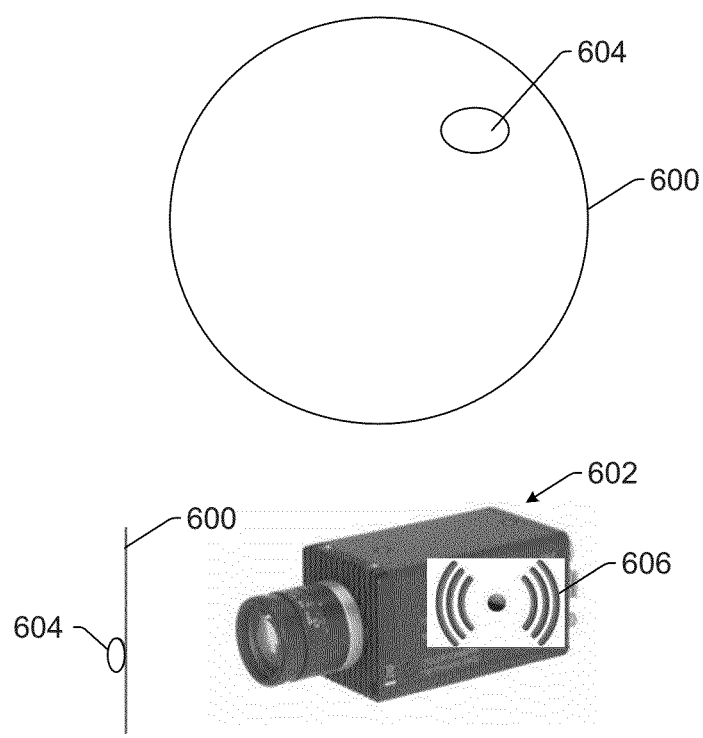
FIG. 6 is a schematic diagram illustrating a perspective view of a base unit optical subsystem and side and cross-sectional views of one embodiment of one or more elements of a measurement unit.

In another embodiment, the one or more elements of the measurement unit are passive elements. In a different embodiment, the one or more elements of the measurement unit are active elements. For example, the pose of the measurement unit may be measured by the base unit based on passive or active elements on the measurement unit that are imaged by the base unit. As an example, the active elements may include one or more LEDs. As another example, the passive elements may include one or more "screens" such as screen 600 shown in FIG. 6. As shown in FIG. 6, screen 600 may be planar (that is, substantially flat in at least one plane of the screen). However, the screen may be curved. For example, in one embodiment, at least one of the one or more elements of the measurement unit has a curved surface that at least partially reflects the light directed by the base unit. A screen that includes a curved surface may enable larger angles of acceptance of the light of the base unit on the screen. As shown in FIG. 6, base unit 602 may direct a light beam onto the screen that forms spot 604 on the screen. The base unit may generate an image of the tight beam on the screen that can be used to determine the position and/or pose of the measurement unit with respect to the base unit. As such, the base unit may include a camera that images a screen when a tracker beam from the base unit hits the screen. Base unit 602 shown in FIG. 6 may also include wireless transmitter 606 configured to transmit information about the position and/or pose of the measurement unit relative to the base unit such as the offset between the measurement unit and the base unit.

Figure 7:
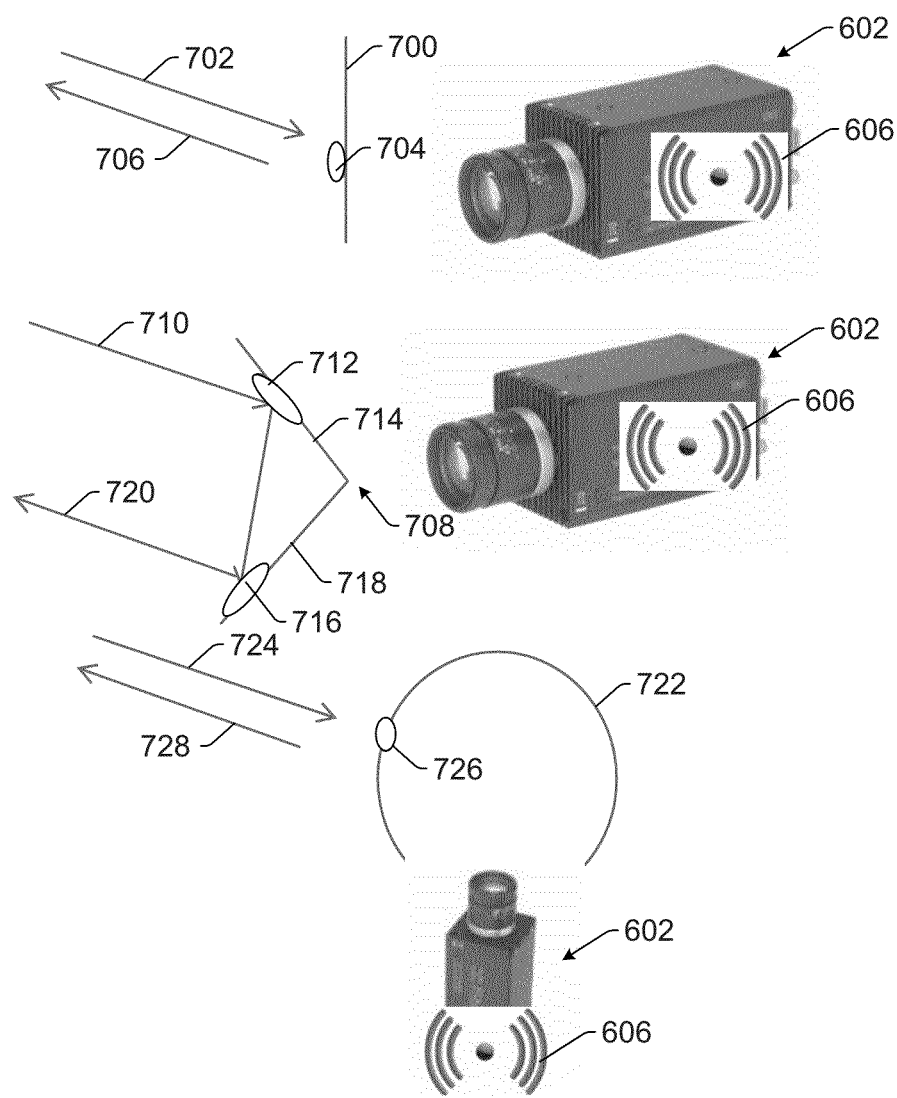
FIG. 7 is a schematic diagram illustrating a perspective view of a base unit optical subsystem and side views of various embodiments of one or more elements of a measurement unit.

As noted above, the one or more elements of the measurement unit may include a screen that is planar or curved. Such a "screen" may also have other configurations. In any case, the measurement unit "screen" should reflect (or scatter) light back to the base unit and at the same time enable position and potentially pose measurements. In one such example, as shown in FIG. 7, the one or more elements of the measurement unit may include flat pseudo-reflective screen 700 that can be used to determine where the tracking beam of the base unit hits the measurement unit. For instance, the base unit can direct light 702 to spot 704 on screen 700 and detect tight 706 reflected from the screen. Camera 602 may be used to find the offset between spot 704 and the center of screen 700 and transmit this offset (using wireless network 606) to the base unit to improve the estimate of the position of the measurement unit.

In a different example, as shown in FIG. 7, the one or more elements of the measurement unit may include pseudo-reflective cube 708 that can be used to determine the pose and/or the position or centering of the measurement unit. For instance, the base unit can direct light 710 to spot 712 on surface 714 of the cube. Surface 714 may be configured to reflect the light to spot 716 on surface 718 of the cube, which itself may be configured to direct light 720 back to the base unit.

In another example, as shown in FIG. 7, the one or more elements of the measurement unit may include curved surface 722 (e.g., a sphere) to increase the acceptance angle of the measurement unit screen. The base unit may direct light 724 to spot 726 on the screen and detect light 728 reflected from the screen.

The configuration of the one or more elements of the measurement unit and the base unit described above (e.g., a relatively simple screen and a relatively simple camera) is advantageous because it allows relatively low cost components to be used for tracking compared to other components that could be used such as relatively expensive retro reflectors. In addition, such configurations of the base unit allow relatively low cost imaging components to be used compared to other imaging components such as position sensitive detectors (PSDs). Furthermore, one or more elements of the measurement unit having a curved surface allow a larger capture range/angle versus the relatively limited acceptance angle of a retro reflector.

The measurement unit itself may also be configured to generate information regarding its position and/or pose within the construction site. For example, the measurement unit may include an IMU configured to measure the x, y, and z position and pose of the measurement unit after an initialization process. In addition, the measurement unit may be configured to use Simultaneous Localization And Mapping (SLAM) algorithm to determine the position of the measurement unit using images collected by the measurement unit of the construction site. In addition, the measurement unit may include an accelerometer configured to detect the angle that the measurement unit is tilted with respect to the earth (pitch, roll), a compass configured to detect the yaw of the measurement unit, and real time location of known points such as known objects, artificial markers, and using multiple cameras on pan, tilt, and/or zoom mounts. Therefore, the measurement unit may be configured to determine its position with respect to the construction site in the same manner that the base unit is configured to determine its position with respect to the construction site.

Figure 12:
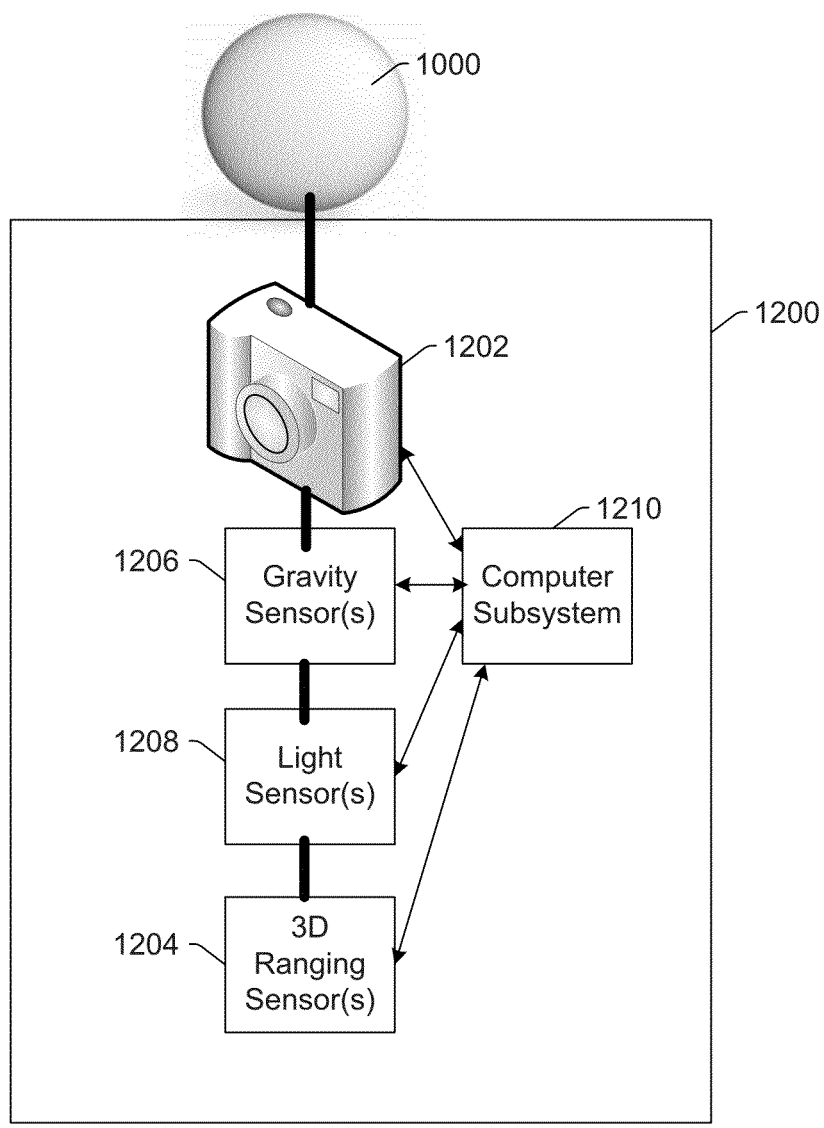
FIG. 12 is a block diagram illustrating another embodiment of a measurement unit.

In another embodiment, the measurement unit includes one or more sensors configured to determine the direction of gray relative to a coordinate system of the measurement unit. For example, as shown in FIG. 12, which is described further herein, measurement unit 1200 may include gravity sensor(s) 1206. The gravity sensors may include any of the gravity sensors described herein.

In some embodiments, the measurement unit includes one or more devices configured to determine an azimuth direction of the base unit in a coordinate system of the measurement unit. For example, the measurement unit may include one or more sensors that are configured to detect light from the base unit and a computer subsystem configured to determine an angle of illumination used by the base unit. In one such example, as shown in FIG. 12, the measurement unit may include one or more tight sensors 1208, which may include any suitable light sensors known in the art. The angle of illumination measured by the measurement unit may then be used to correct the x, y, and z coordinates determined by the base unit. For example, the angle of illumination information may be transmitted from the measurement unit to the base unit and used by the computer subsystem of the base unit to correct the position of the measurement unit determined by the base unit.

Figure 8:
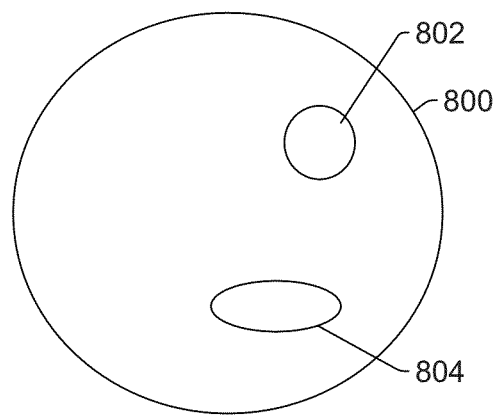
FIG. 8 is a schematic diagram illustrating a side view of one embodiment of one or more elements of a measurement unit and various light beams of a base unit incident on the one or more elements.

In one embodiment, the computer subsystem of the base unit is configured to determine the position and pose of the measurement unit with respect to the base unit based on a shape of the light of the base unit on at least one of the one or more elements of the measurement unit. For example, the base unit may be configured to determine the pose of the measurement unit versus the base unit using analysis of the beam spot shape. In one such example, the elliptical nature of the spot (axis orientation and potentially size) can be used to determine the pose of the measurement unit versus the base unit plus distance information. For example, as shown in FIG. 8, screen 800, which may be configured as further described above, may be used as the one or more elements of the measurement unit. In such an instance, light from the base unit will form different spots on the screen based on the relative positions of the measurement unit and the base unit. More specifically, if the tracking beam (not shown in FIG. 8) is substantially normal to the measurement unit screen, spot 802 may be formed on screen 800 while if the tracking beam is coming at an angle with respect to the measurement unit screen spot 804 may be formed on the screen addition, the base unit may be configured to get the whole pattern of the beam and to perform analysis of the pattern with some orientation.

In another embodiment, the computer subsystem of the base unit is configured to determine the position and pose of the measurement unit with respect to the base unit based on locations of multiple light beams directed by the optical subsystem of the base unit onto at least one of the one or more elements of the measurement unit. The multiple light beams may be directed onto the one or more elements of the measurement unit sequentially or simultaneously. The information generated using each of the multiple light beams may be used in combination to determine the position and pose of the measurement unit. Each of the multiple tight beams may be directed by the optical subsystem of the base unit as described further herein.

In some embodiments, the measurement unit includes one or more sensors configured to detect the light from the optical subsystem of the base unit and one or more devices configured to send feedback to the base unit based on output from the one or more sensors such that the base unit can re-direct the light to the one or more elements of the measurement unit. For example, as shown in FIG. 12, the measurement unit may include light sensor(s) 1208 that are configured to detect the light from the base unit. Computer subsystem 1210 of the measurement unit can then send information about the detected light such as position on a photosensitive screen or other position information back to the base unit. Such feedback and re-directing the light by the base unit may be performed to correct one or more characteristics of the light (e.g., illumination angle) directed to the measurement unit or to perform different measurements that can be used in combination to determine the position and pose of the measurement unit as described further herein.

In addition or alternatively to the position determination schemes described above, the position of the base unit and/or the position of the measurement unit within the construction site may be determined using UPS technology such as Differential GPS that can be used in exterior construction sites with a possible 2 cm accuracy, Local UPS such as the technology commercially available from Locata, ultrasonic ranging, which is relatively inexpensive with relatively low accuracy, and WiFi "beacon detection" like VOR (very high frequency (VHF) omnidirectional radio) ranging (radio-goniometers) with multiple base units for triangulation (multipathing may be an issue so select low-frequencies for best structure penetration). Therefore, the POV coordinates/attitude may be determined from on-board navigation devices (e.g., GPS, UWB, IMU) and/or a composite high accuracy coordinate/attitude determination may be performed by combining such georeferencing with image-derived data.

The measurement unit includes a measurement device configured to be used by the measurement unit or the base unit to determine information for the construction site. The measurement device may have a measurement range that is on the order of, for example, a few meters. The measurement device may be configured to determine information for the construction site optically. For example, as shown in FIG. 1, the measurement device may be configured to direct light 118 to one or more construction elements (not shown in FIG. 1) of a construction site and to detect the light reflected, scattered, or otherwise returned from the one or more construction elements. In addition, as described further herein, the measurement device may include a number of different sensors, cameras, devices, etc, configured to perform a number of different measurements. Mosaicing of multiple measurements of the construction site may be performed to generate more information about the construction site.

The measurement unit or the base unit may process the output generated by the measurement device locally or may upload the output to a local fixed station or an external cloud. For example, as shown in FIG. 12, measurement unit 1200 may include computer subsystem 1210, which may be configured as described further herein, that is configured to determine the information for the construction site based on output of one or more measurement devices included in the measurement unit. The measurement unit shown in FIG. 12 may be further configured as described herein. In this manner, the measurement results may be processed either on the spot or offline to measure objects. The extent of processing performed locally may be limited to determining if sufficient measurement coverage of the objects has occurred. In addition, computer-aided design (CAD) or design data may be pre-processed to enable fast processing after capturing the measurements (while still in the construction site).

In some embodiments, the position to which the measurement unit is moved by the user within the construction site may be determined by the system. For example, the POV of the measurements performed by the measurement device may be determined to ensure that collection of data is done with complete coverage (or as close as possible). In one such example, the design data for the construction site may be used to determine visibility within the construction site and plan for POVs to acquire data. In this manner, prior knowledge (design data) from the BIM can be used to plan for desired POVs to achieve maximal coverage of the construction site. In addition, prior knowledge (design data) from the BIM and scheduling software can be used to plan for which objects need to be monitored at a given time and potentially from what locations to monitor them. The measurement unit may include one or more devices such as a display device described herein that can be used by the system to guide the user through a graphical user interface (GUI) to the desired POV or locations where the data should be acquired. In this manner, the measurement unit may include a data acquisition system that includes a location measurement device and optionally a guidance system.

In some instances, the system may be configured to perform off-line analysis of the BIM to determine advantageous POVs for the portable devices including the measurement unit and possibly the base unit. For example, the system may be configured to preprocess the BIM data. In one such example, the system may load BIM data of the objects to be measured and their immediate surroundings as predicted by the BIM and schedule information. The system may then identify good locations from where to take low and/or high resolution 3D images to minimize occlusions and number of acquisitions while maximizing quality of data, i.e., object contrast and registration). In addition, the system may verify that all objects that will be visible during data acquisition are loaded (or at least all that are required for good registration and object extraction). In such instances, the user may be instructed through a user interface described herein to go to particular locations and acquire data.

In one embodiment, the information for the construction site acquired by the systems described herein includes one or more characteristics of one or more construction elements of the construction site. For example, the embodiments described herein can be used to document the as-built conditions of the construction site. In addition, the embodiments can be used to monitor construction progress and activities.

In one embodiment, the one or more characteristics include a presence or an absence of the one or more construction elements. For example, the embodiments described herein can be used to monitor the presence/absence of construction elements in a construction site versus a BIM. In a "macro" case, therefore, the systems described herein can be used for detection or presence/absence of construction elements such as walls, sockets, fixtures, pipes, rebar, and glass with relatively low resolution (cm level). Some positioning information may be desired (with a centimeter or decimeter accuracy), sufficient to establish correspondences between the sensed objects and those described in the BIM.

In another embodiment, the one or more characteristics include position, dimension, or some combination thereof of the one or more construction elements. For example, the embodiments can be used to monitor the dimension and/or placement accuracy of construction elements in a construction site versus a BIM. In this manner, the system may be used to measure characteristics (dimensions, placement, size, orientation, etc.) of objects in the construction site for quality assurance (QA) and quality check (QC) purposes. The systems may also be used for documenting as-built dimensions and objects before, during and after construction.

Preferably, the measurement unit or the base unit acquires construction element coordinates with enough accuracy to be able to determine parameters to a relatively good accuracy about 3 mm) at a relatively fax distance (e.g., about tens of meters). In addition, the measurement device preferably measures the position and dimension of a construction element from several meters distance. For a measurement device, uncertainty in measurement increases with distance. Therefore, to maintain acceptable signal-to-noise (S/N) in the measurements, a higher power can be used as the measurement distance increases, which reduces operating time.

In a "micro" case, therefore, the systems described herein can perform position measurements of various construction elements in a construction site with relatively high positional accuracy (e.g., about 3 mm to about 5 mm for "rough" work such as framing and about 1 mm for finishes). In the "micro" case, the measurement unit or base unit may identify objects in images or output produced by the measurement device, cross-reference the output or the images to the BIM, and isolate points of interest whose range can be measured accurately. These ranges may serve two purposes: 1) accurate location of the actual POV used and 2) accurate measurement of the positions of the objects of interest relative to the POV used. Therefore, the system may be configured to perform multiple range measurements to solve simultaneously for the position/attitude of the POV and the position of the objects of interest. In addition, the measurement device may be used to capture either or both large field of view data and higher resolution data of specific objects. For example, the measurement device may include a relatively large field of view imaging device that can recognize targets or objects in the construction site to thereby give the object and its surroundings.

Furthermore, it may be desired to sense material composition and/or identify components by possible attached tags (e.g., RFID, barcodes, etc.). In addition, some level of material analysis may be achievable by texture detection in the images acquired by the measurement device. Alternatively, special sensors can be used for material analysis (e.g., an ultrasound ranging system may be able to detect glass which is optically transparent and a magnetometer may be able to identify a steel beam).

Figure 9:
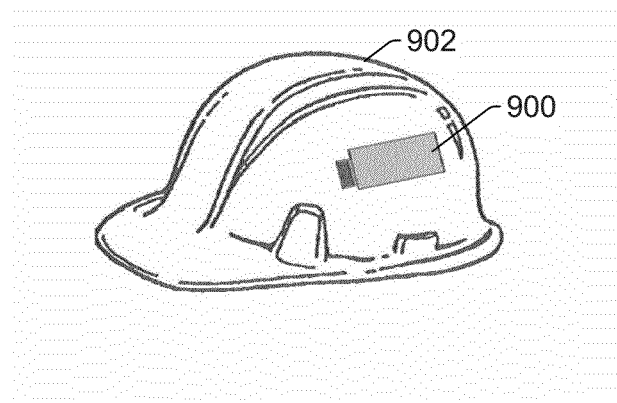
FIGS. 9-11 are schematic diagrams illustrating perspective views of different embodiments of a measurement unit.

As described above, the measurement unit is configured to be moved within a construction site by a user. Therefore, the measurement unit, like the base unit, is portable. In some instances, the measurement unit may be wearable. For example, as shown in FIG. 9, measurement unit 900 may be mounted on helmet 902 such as a hard hat. Therefore, the measurement unit may provide unobtrusive imaging and may include any of the measurement devices described herein such as WiFi enabled cameras with position and attitude determination capabilities. However, the measurement unit may be mounted on any other wearable unit such as other hats or helmets, a wearable vest, a visor system, and the like. Preferably, the measurement unit is mounted on the wearable unit such that the measurement device in the measurement unit can be in a relatively stable position during measurements. Other portable measurement units are of course possible. For example, the measurement unit can be attached to a handheld unit as shown in FIG. 1, a device such as a cart that can be wheeled around the construction site, and a portable and possibly detachable tripod such as that shown in FIG. 1.

Figure 10:
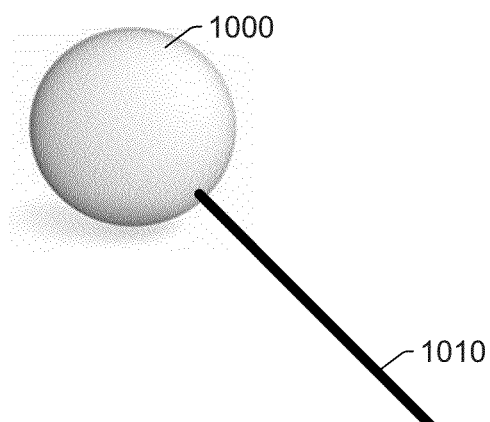

In some embodiments, the measurement device includes a rod having a first end coupled to the measurement unit and a second end that is positioned by the user in contact with one or more construction elements for which the information is being determined, and the rod has a predetermined, fixed length and orientation with respect to the measurement unit. For example, the measurement device can be simply a contact sensor (e.g., a rod) that can be brought into contact with a known point on a construction element. In one such example, as shown in FIG. 10, the measurement unit may include sphere 1000 that is used as a "screen" as described above for determining the position of the measurement unit relative to the base unit. The measurement unit also includes rod 1010 that is coupled to the sphere at one end and has a second, free end that can be positioned by the user in contact with one or more construction elements. Preferably, rod 1010 has a predetermined, fixed length and is coupled to the measurement unit in a known manner. As such, the base unit can determine the position and/or pose of the measurement unit by directing light to and detecting light from sphere 1000 and use that information in combination with the known length and orientation of the rod to determine the position and/or other information regarding a construction element in contact with the second end of the rod. Although the rod is shown coupled to only a sphere in FIG. 10, it is to be understood that a measurement unit that includes such a measurement device may include any other elements described herein. In addition, as shown in FIG. 10, the measurement unit may include only passive elements (e.g., the sphere and the rod). However, the measurement device may include such passive elements in combination with other active and/or passive elements.

Figure 11:
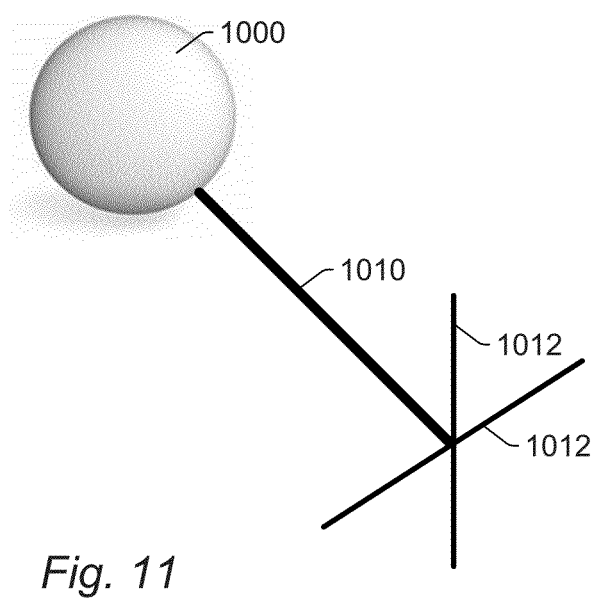

Furthermore, although rod 1010 is shown in FIG. 10 with a substantially simple second end that may be brought into contact with the one or more construction elements for which information is being acquired, the second end of the rod may have a number of different configurations that can be used to determine information about the orientation of the rod with respect to the one or more construction elements it is in contact with. For instance, as shown in FIG. 11, the second end of the rod may be coupled to one or more other rods 1012 arranged at various angles with respect to the rod coupled to the sphere. The additional rods may be configured such that when each rod is positioned flush with a construction element, the rod attached to the sphere has a known position relative to the construction element. In addition, other elements such as suction cups and/or magnets (not shown) may be coupled to the second end of the rod such that the measurement unit can be temporarily coupled to the one or more construction elements being measured.

In some embodiments, the measurement device includes a stereo camera configured to generate one or more images of one or more construction elements of the construction site. For example, camera 1202 shown in FIG. 12 may be configured as a stereo camera. A stereo camera can be used to create a relatively dense 3D image of the one or more construction elements. The accuracy of a stereo camera is inversely proportional to the square of the object distance and linear with the camera disparity. Therefore, a stereo camera may be used for objects that are relatively close to the measurement unit. The 3D images generated by any of the embodiments described herein may be used with preprocessed design data to extract the objects that need to be measured in the images. The extracted objects may include the object that needs to be measured and any other objects that the measurements will need to refer to (e.g., a distance from the object to a door or to a wall). In addition, instead of relatively dense 3D images of the one or more construction elements, any of the measurement devices described herein may be configured to acquire relatively low density 3D data for the one or more construction elements. For example, the measurement device can acquire a low density of 3D data and higher density 2D data where the QC measurement uses both these data sets thereby saving costs in acquiring the 3D data.

In some embodiments, the measurement device includes an illumination subsystem configured to direct structured illumination onto one or more construction elements of the construction site. For example, camera 1202 shown in FIG. 12 may include an illumination subsystem that is configured for structured illumination, Structured illumination can be used to create a relatively dense 3D image of the one or more construction elements. Structured illumination may used in combination with a stereo camera addition, structured illumination can be measured with a 2D camera in addition to (or instead of) a range sensor (such as a time of flight (TOF) or phase sensor) and therefore can get the depth information from the points on the projected lines (structures) directly. Structured illumination advantageously provides measurements that do not depend on object shape.

Figure 13:
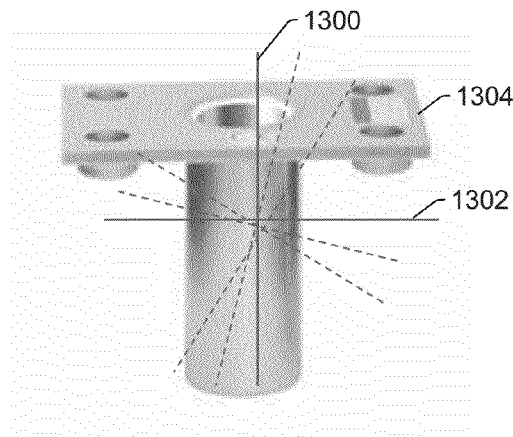
FIG. 13 is a schematic diagram illustrating a perspective view of one embodiment of structured illumination incident on a construction element.

In one such embodiment, the measurement device can have a line or crossed line projector that can be translated and/or rotated to create a set of lines (or any other shape) on the measurement object and a separate 2D camera to image the resulting set of images and extract 3D shape information. For example, as shown in FIG. 13, two crossed lines 1300 and 1302 may be projected onto construction element 1304 by a measurement device (not shown in FIG. 13). The two crossed lines may then be rotated on the construction element (as shown by the dashed lines in FIG. 13) by the measurement device while the measurement device images the construction element. In this manner, a series of images of the construction element can be generated. 3D information about the construction element can be determined from the 2D images as described further herein.

In one embodiment, the information for the construction site includes one or more 2D or 3D images of one or more construction elements of the construction site. More than one image of the one or more construction elements may be captured to enable the viewing of the objects from enough directions. The 2D or 3D images may be captured as described further herein.

In another embodiment, the measurement device includes a 2D camera, and the information includes a 3D image of the construction site generated by the base unit or the measurement unit using two or more 2D images generated using the 2D camera. For example, as shown in FIG. 12, measurement unit 1200 may include sphere 1000, which may be used as the one or more elements of the measurement unit as described above. Alternatively, sphere 1000 may be replaced with any of the other one or more elements described herein. As further shown in FIG. 12, measurement unit 1200 may include 2D camera 1202. The 2D camera may be an imaging system such as a still camera, a video camera, and cameras with and without pan, tilt, and zoom actuators. For example, the measurement device may include a 2D camera to extract object shape (in 3D) by acquiring multiple 2D images from different points of view. The 2D camera shown in FIG. 12 may be replaced with any other camera described herein such as a stereo or 3D camera. In addition, although a variety of measurement devices are shown in FIG. 12, it is to be understood that any of the measurement devices described herein may be included in any combination in a measurement unit described herein.

The base unit or the measurement unit may construct the 3D object shape using the x, y, z position of the measurement unit, the pose of the measurement unit or with a higher computation effort such as a SLAM algorithm. The 3D image may be generated using BIM analysis to determine points of alignment in the construction site (such as corners or artificial markers such as those described further herein) and locating those points of alignment in the 2D images. In this manner, the systems described herein may be configured for 3D stereopsis. In another sequence, the measurement device may perform image acquisition. The base unit or the measurement unit may then perform object isolation (scale-invariant feature transform (SIFT), corners, etc.) and camera calibration for intrinsic parameters such as zoom, distortion and lens model and extrinsic parameters such as location and attitude. Intrinsic camera calibration may be performed using controlled targets and extrinsic camera calibration can be performed by measuring attitude and location. The base unit or the measurement unit may then perform object redetection in multiple images followed by geometric range determination. Furthermore, the base unit or the measurement unit may be configured to generate a 3D image from two or more 2D images using open source software such as Parallel Tracking and Mapping (PTAM), Parallel Tracking and Multiple Mapping (PTAMM), Bundler, and Patch-Based Multi-View Stereo Software (PMVS), and Photosynth and Kinect commercially available from Microsoft. The measurement device may also be configured to take multiple views with different focal lengths (e.g., via zooming or multiple cameras) for "foveal" detail insertion. The acquisition of the 2D images and any other images described herein may be RIM-guided. For example, the BIM may be used for real-time association of detected objects with BIM features. In addition, the BIM may be used for pre-planning of POVs as described further herein.

In an additional embodiment, the measurement device includes one or more 3D ranging sensors, and the information includes 3D data for the construction site generated based on output of the one or more 3D sensors. For example, as shown in FIG. 12, the measurement device may include 3D ranging sensor(s) 1204. The measurement device may include ranging systems such as LIDAR systems, laser distance measurement devices, ultrasound rangers, stereo optical cameras, and structured illumination ranging subsystems (e.g., Kinect, Moire, etc.). Relatively coarse 3D sensing may be used to get approximate locations of objects in images. In one preferred embodiment, the measurement device is configured to generate a combination of 2D data (images) and range (3D) information.

In some embodiments, the measurement device includes a single point scanner. For example, the measurement device can include a single point scanner such as a galvanometer or a micro-electro-mechanical (MEM) based scanner that points or scans light from a distance. In addition, the measurement device may perform measurements such as time of flight or phase shift.

In one embodiment, the measurement device includes a range sensor. For example, if objects are identified, a low-bandwidth ranging apparatus can be used to determine accurate ranges. For example, a pan and/or tilt mounted distance meter can be pointed at the objects of interest and the ranges measured. Alternatively, pointing devices can be used for higher speed (e.g., galvanometer-mounted mirrors to direct a laser). Also, multiple distance meters can be used depending on the accuracy needed (e.g., less accurate but spatially detailed ranging can be achieved with stereo cameras). Active illumination systems can be combined with the systems described above to test characteristics of the objects in question (e.g., a projected laser line can be used to verify planarity of a wall surface).

The aim is to acquire sufficient ranging data for PONT location and object ranging, but to minimize the tendency to measure dense point clouds, which require massive post-processing for object isolation. The prior knowledge embodied in the BIM can be used to guide the data acquisition. For example, if the BIM indicates that a flat wall is expected at a particular location, it is sufficient to measure ranges to 3 points on the wall to establish accurate plane location.

The measurement unit may also include any or all of the above-described measurement devices in any combination. In this manner, the measurement unit may perform different measurements simultaneously and/or sequentially. For example, the measurement unit may perform a hierarchy of measurements that starts with a relatively low resolution ranging scheme (e.g., depth or range scheme with or without 2D). This initial image can be created by any sensor capable of 3D sensing. The initial alignment can also be performed by relying on alignment targets. The relatively low resolution ranging scheme can be followed by a relatively low bandwidth, higher accuracy fine alignment using a limited data set of points that can be either reacquired or are just a subset of the original ones. This subset can be chosen by BIM analysis (and the 2D or 3D image analysis) to determine the points of alignment (e.g., corners). The as-built BIM (versus the as-designed BIM) may be maintained for registration in subsequent data acquisitions (later in the construction project or later in time).

In addition, several versions of portable instruments may be used to accommodate different use cases with varying accuracy. For example, as noted above, a single measurement unit may include different measurement devices that are configured to perform different measurements thereby increasing the measurement capability of the measurement unit. Alternatively, the system itself may include multiple measurement units, each including one or more different measurement devices. Each of the measurement units may be used sequentially or simultaneously depending on the information about the construction site that is to be acquired by the system. Furthermore, different measurement devices will exhibit significantly different noise levels. Therefore, measurement heuristics may be developed that indicate the reliability of particular measurements so they can be ignored if inconsistencies are detected. The measurement device may also include any other suitable measurement devices known in the art such as a UBM device.

In some embodiments, the measurement unit includes a computer subsystem configured to display to the user on a display device of the measurement unit the information for the construction site with a design for the construction site. For example, if the output of the measurement device is processed in real time, the user may be given feedback by being shown an overlay of image data with a rendered version of the BIM, plus some annotation (virtual reality) of conclusions from the comparison of the images to the BIM/metadata. Objects that are missing but should have been there for schedule adherence can be flagged and annotated, both for the local user and/or a central project manager. In addition, the systems described herein may be used to interface with the BIM software (or other navigation software) to display progress of construction of various objects, in/out specs, and measured data. In some such embodiments, once the coordinates of what the measurement device is "looking at" are known, the data from those coordinates can be acquired and the BIM rendered and then shown with the acquired information. In addition, the BIM can be overlaid with the acquired information as in an augmented reality application. Therefore, the measurement unit can be configured as an augmented reality device that overlays the actual site image with the design data, and the construction site image can be a 2D image or can include depth information. However, the BIM can also or alternatively be displayed side-by-side with the acquired information or by sequentially flashing the BIM and the acquired information on a display device.

In one embodiment, the construction site is a partially constructed building. The construction site may be in various states of being built. For example, the construction site may be in the planning and surveying stage, the earthwork stage, the building construction stage, and even in the operation stage (e.g., for a partially completed building or a building or structure being remodeled or repaired).

In another embodiment, the measurement unit or the base unit is configured to use the information for the construction site to determine if one or more elements detected in the information are permanent construction elements or temporary elements. For example, during construction, significant occlusion of objects of interest may be caused by objects left on site (e.g., tools (e.g., buckets, ladders, and drills), containers, clutter (e.g., refuse and junk)) or by temporary structures such as cloth barriers, scaffolding, rails, ramps, and safety devices). These objects and structures may or may not be present in the BIM. In this manner, the measurement unit or the base unit or even another is computer subsystem can compare the information for the construction site to the BIM, and objects detected but not in the BIM have a high probability of being temporary or clutter and thus can be filtered out. For example, once the temporary elements are identified, those elements can be rejected from any further measurements and calculations. In one such example, the temporary elements may be detected and classified as "not an object of interest" and excluded from analysis in most cases. The results of the comparison and any other results described herein can be stored and reported as described further herein.

The embodiments described herein may also be configured for identification and/or handling of missing data. For example, occlusion of objects of interest by other objects or by clutter or temporary structures is unavoidable. However, knowledge of the temporary elements can be used to determine if they occlude or "hide" permanent construction elements, and that information can be used to modify any additional measurements and/or calculations that are to be performed by the system. In one such example, once temporary objects have been identified, a relatively sparse number of precision measurements (e.g., LIDAR-based) of the remaining objects may be used to get relatively accurate locations of those objects. In addition, to the degree possible, occlusion of objects of interest can be remedied with additional POVs, but it may also be impossible to move to locations with visibility of the objects and structures in question. Fallback strategies to handle such missing data and allowing manual tagging of progress for these objects may be provided. Furthermore, additional applications can be developed to report some of these temporary elements as safety concerns if desired.

In some embodiments, the measurement unit or the base unit is configured to use the information for the construction site to correlate one or more elements detected in the information with one or more construction elements in a design for the construction site. For example, 2D images may be used to create a 3D model of the construction site as described herein that is then compared to the BIM. In addition, LIDAR may be used to create a range image of the site that is compared to the BIM. In either of these instances, the BIM may be preprocessed by the system to enable on-site comparison of the as-built construction elements to the BIM. For example, output of the measurement device such as image data can be processed either real time or off-line to establish and/or refine the BIM correspondence. In this manner, BIM design data can be used to associate approximate 3D or 2D points with objects called for in the BIM.

Information about one or more construction elements determined by the systems described herein that are correlated to one or more elements in the BIM may be compared to specifications for the one or more elements. In this manner, the embodiments described herein may be used for dimensional QA/QC by comparing the as-built information to the design information and measuring, reporting, displaying, analyzing, or recording any of the information generated by the systems described herein. Furthermore, the information generated by the embodiments described herein may be used to accumulate or update a 3D model of the construction site that is both cumulative and updateable. For example, new information generated by the systems described herein may be cross-registered with an existing model to enable changes to be updated to the existing model.

The embodiments described herein may be used in a variety of dimensional QA/QC tasks and in various phases of a construction project. For example, the survey phase of construction may include site survey, location survey, and hazardous materials analysis. In this phase, the systems described herein may be used to identify deviations from construction plans such as additional columns, openings, wrong dimensions; shifted structures; distance to nearby structures; and locations of connecting structures. The excavation and piling phase of construction may include digging, piling, creating walls, and creating access to utilities. In this phase, the systems described herein may be used to identify position of piles; steel plates, rebar placement; position trueness of walls; and utilities cut out position. In addition, the structural work phase of construction may include placing rebar, and decks. In this phase, the systems described herein may housed for shop or field inspection and to measure the position and dimension of pre-pour objects such as sleeves or edge forms.

In a further embodiment, the computer subsystem of the base unit, the measurement unit, or another computer subsystem is configured to generate information about progress of the construction site. For instance, the system may use information about one or more construction elements such as presence, absence, size, placement, orientation, etc., all of which may be determined as described further herein, in combination with the BIM and/or metadata such as the scheduling of the construction tasks to determine if the construction is proceeding on schedule, if the construction elements that are built are built correctly, if corrections need to be made to any of the construction elements, and the like. In other words, the information generated by the system may be analyzed to find construction task progression and object dimensions and locations. In this manner, the systems described herein can generate information that is of significant importance to those responsible for the building of the construction site and/or for those for whom the construction site is being built.

The embodiments described herein may be used in a variety of progress monitoring use cases and in various phases of a construction project. For example, during construction of floors, which may include placing rebar and laying concrete, the systems described herein may be used for leveling applications. In addition, the core (elevator, utilities) phase may include creating an elevator shaft, vertical pipe and chase. In this phase, the embodiments described herein may be used to monitor dimensions and trueness and tie-in points. The shell phase of construction may include creating and/or placing cladding, window openings, and curtain walls. In this phase, the embodiments described herein may be used to monitor tie-in point positions, dimensions, and tie-in and trueness of rails. The interior phase of construction may include framing, MEP rough-in, tenant improvements, and final finishes (ceiling, glass). In this phase, the embodiments described herein may be used to verify compliance to the arm and document as-built model to reduce the cost of future building maintenance.

The information about the progress of the construction site may be generated at different points in time such that progress can be monitored over time. This can be used for example to measure the additional fire insulation material that has been sprayed over the steel structure. In addition, the embodiments described herein may be used for "persistent surveillance" of construction sites. In particular, the embodiments described herein may be used for repeated observations by inexpensive, unobtrusive sensing elements. For example, the progress monitoring may include comparing the as-built construction site with the BIM, which may be performed as described herein, and may include collecting, reporting, displaying, analyzing, or recording any of the information described herein that is generated by the system. In addition, the information about the progress of the construction site may be used tbr activity monitoring such as surveillance, safety, and productivity. The systems described herein can also be used for pre- and post-construction applications such as 3D mapping, visualization, disaster pre- and post-construction, emergency response, city planning, and structure health monitoring.

In some embodiments, the embodiments described herein may be used to layout (position) one or more construction elements based on a model. For example, the systems described herein may be used to guide construction activities to be performed at the right locations and size in reference to other objects on the site. In one such example, the system may be configured to guide a construction activity by marking on walls (or other objects) or by projecting an image onto the walls or other objects. For instances, with the BIM and task schedule data, an instrument can mark the location and other information for an accurate positioning of a construction activity, e.g., where a hole needs to be drilled. In such instances, the instrument may register the locations of objects using 3D images. In addition, construction equipment does not need to have location measurement devices built in since the systems described herein can guide the construction worker through markings (physical or optical, e.g., laser lines). For example, a measurement unit described herein can project light to indicate where a task needs to be performed and/or project light to create a marking, on an object. The marking can be created through a chemical reaction in a material that is placed on the construction object. In some such instances, the systems described herein may also be configured to control various equipment within the construction site.

Any of the embodiments described herein may also include fixed auxiliary devices that may be used to establish position datums (fixed reference points) and may include network interfaces, local computing power, and data storage. This units may also contain computing servers, WiFi access points, UWB or radio beacons, disk drives, and other storage devices. An interface to a "cloud" that manages BIM, metadata, and databases may also be provided. The cloud may be local or remote depending on user needs.

The embodiments described herein have a number of advantages over currently used systems. For example, the systems described herein have a relatively low cost (about 1,000 to 10,000 USD) compared to other systems. In addition, the embodiments described herein may have about 1 mm accuracy with laser ranging (using phase shifting techniques), about 3 to 10 points per second measurements, pan and/or tilt mount or galvo mirrors, and real-time location and pose of camera. The systems described herein are also substantially robust and can be made extremely light for increased portability. Furthermore, the embodiments described herein are flexible and expandable. For example, the embodiments described herein clearly have the ability to integrate new sensor modalities as they become available.

Moreover, the embodiments described herein can be used to help identify and correct mistakes that have been or are being made in the building of the construction site. For example, differences between the information acquired from the construction site and the BIM may be used to determine if mistakes have been made, e.g., in the positioning and/or sizing of one or more construction elements. In addition, the systems described herein can be used to identify mistakes before it is no longer feasible to correct them. Since mistakes that occur in construction sites can add about 20% or more to the total construction costs, the systems described herein can provide significant costs savings to builders and owners.

Any of the embodiments described herein may also be used for applications other than construction. For example, the embodiments described herein may be used for mining applications. In other words, the embodiments described herein could be used to provide "vision" for mining. For example, the embodiments described herein could be used to provide navigation when GPS signals are obstructed or unavailable in mining areas. In addition, the embodiments described herein can be used to provide surveillance of mining areas. Furthermore, the embodiments described herein can be configured to use lower cost aerostats or unmanned aerial vehicles to communicate with vehicles on the ground. Onboard vision and communication may also be used in these applications.

The embodiments described herein may also be used for military applications such as improvised explosive device (IED) detection. For example, the embodiments described herein can be used for surveillance of widespread or local areas and changes in the areas over time can be identified by comparing images or other data acquired at different points in time by the systems described herein. Such changes may be provided to military personnel for further analysis or could be subject to further analysis (e.g., size and shape analysis) to determine if the changes indicate a threat.

Figure 14:
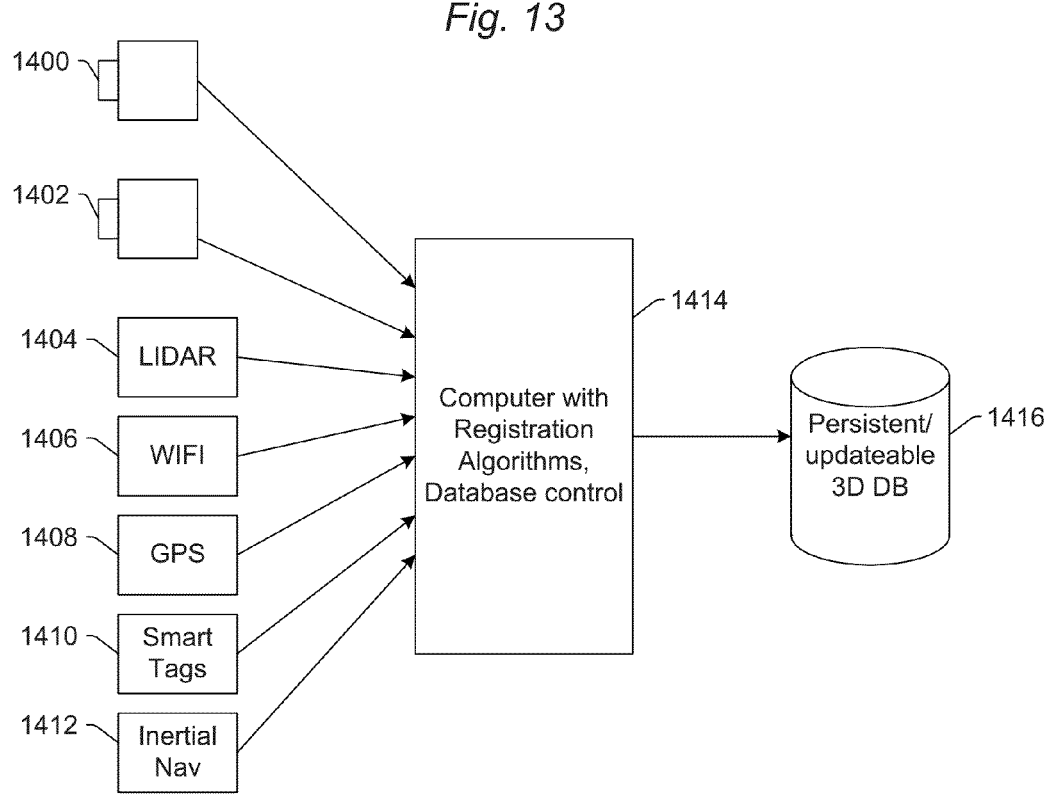
FIGS. 14-15 are block diagrams illustrating various embodiments of a system configured to acquire information for a construction site.

FIG. 14 illustrates one conceptual system block diagram that shows various hardware that may be included in the embodiments described herein. For example, as shown in FIG. 14, the system may include two or more calibrated optics systems 1400 and 1402 that may be used as a base unit and a measurement unit as described herein. At least one of the calibrated optics systems may be configured as described further herein and may be position and attitude aware with static and/or semi-static imaging and/or ranging. In addition, at least another of the calibrated optics systems may be position and attitude aware with mobile imaging and/or ranging. The system shown in FIG. 14 may also include various location and/or attitude sensors such as LIDAR 1404, WiFi 1406, GPS 1408, smart tags 1410, and inertial navigation 1412. Each of the components described above may be configured to communicate wirelessly and/or in a wired manner with computer 1414 that includes registration algorithms and/or database control. The computer may be configured to communicate with persistent and/or updateable 3D database (DB) 1416 that may include a BIM as described herein. Each of the components of the system shown in FIG. 14 may be further configured as described herein.

Figure 15:
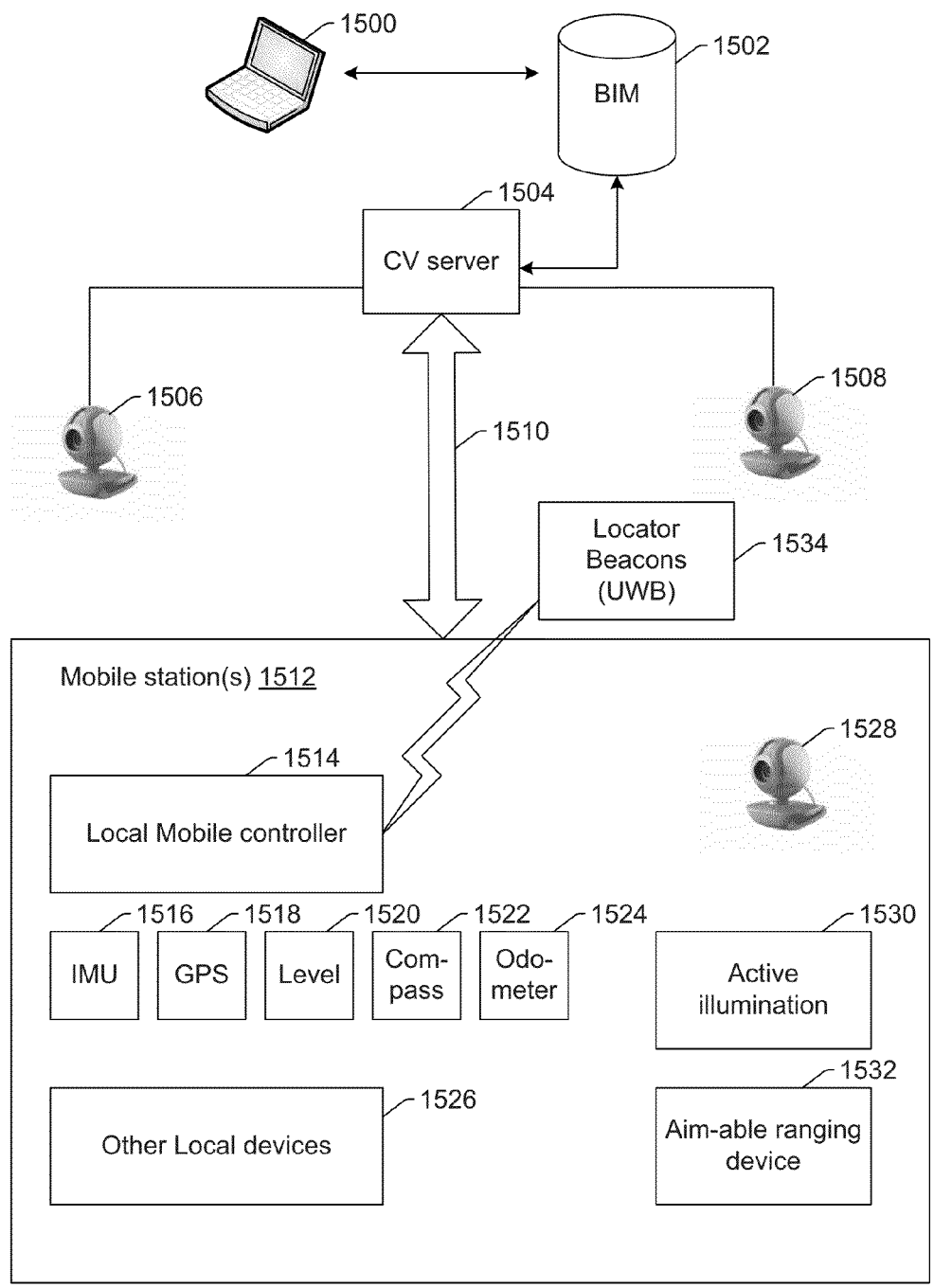

FIG. 15 illustrates one conceptual block diagram of the hardware that may be included in one embodiment of the system. For example, as shown in FIG. 15, the system may include computer subsystem 1500 that can be used to present various information such as the construction site design to a user through a GUI. In general, the GUI may be presented to the user via any suitable computer-based system such as a tablet (e.g., iPad or equivalent), laptop computers, smartphones, audio interfaces, and augmented reality displays (head mounted or eyeglass mounted). The computer subsystem may be configured to acquire the RIM from database 1502 in which the BIM is stored. The computer subsystem may provide a BIM database interface that can be used for graphical rendering of objects, coordinate retrieval of objects, proximity metrics, scheduled creation and/or completion of objects, and critical path navigation of schedules.

The BIM in the database may also be accessible to CV server 1504, which may include any suitable commercially available server. The CV server may be coupled to two or more static observation stations 1506 and 1508, which may be base units configured as described herein. The CV server may also be configured to communicate wirelessly (e.g., via WiFi 1510 or UWB) to one or more mobile stations 1512, which may be measurement units configured as described herein. The one or more mobile stations may include local mobile controller 1514, IMU 1516, GPS 1518, Level 1520, Compass 1522, and odometer 1524, each of which may be configured as described further herein. The one or more mobile stations may also include other local devices 1526, which may include any of the other measurement devices described herein. Furthermore, the one or more mobile stations may include mobile camera(s) 1528, active illumination 1530, and aim-able ranging device 1532, which may be configured as described herein. In addition, the local mobile controller may be configured to send signals to locator beacons (UWB locator beacons) 1534, which may include any suitable locator beacons known in the art.

Another embodiment relates to a method for acquiring information for a construction site. The method includes determining a position of a base unit with respect to the construction site, which may be performed as described further herein. The base unit is positioned within the construction site by a user. The base unit includes an optical subsystem and a computer subsystem. The base unit may be further configured as described herein.

The method also includes directing light to one or more elements of a measurement unit using the optical subsystem of the base unit, which may be performed as described herein. The one or more elements interact with the light in a known manner. The one or more elements may be further configured as described herein. The measurement unit is moved within the construction site by a user and may be further configured as described herein. The method further includes detecting the light after interacting with the one or more elements using the optical subsystem of the base unit, which may be performed as described herein.

The method also includes determining a position and pose of the measurement unit with respect to the base unit based on the detected light (possibly in combination with information from the measurement unit) using the computer subsystem of the base unit, which may be performed as described herein. In addition, the method includes determining information for the construction site using a measurement device of the measurement unit, which may be performed as described herein.

Figure 16:
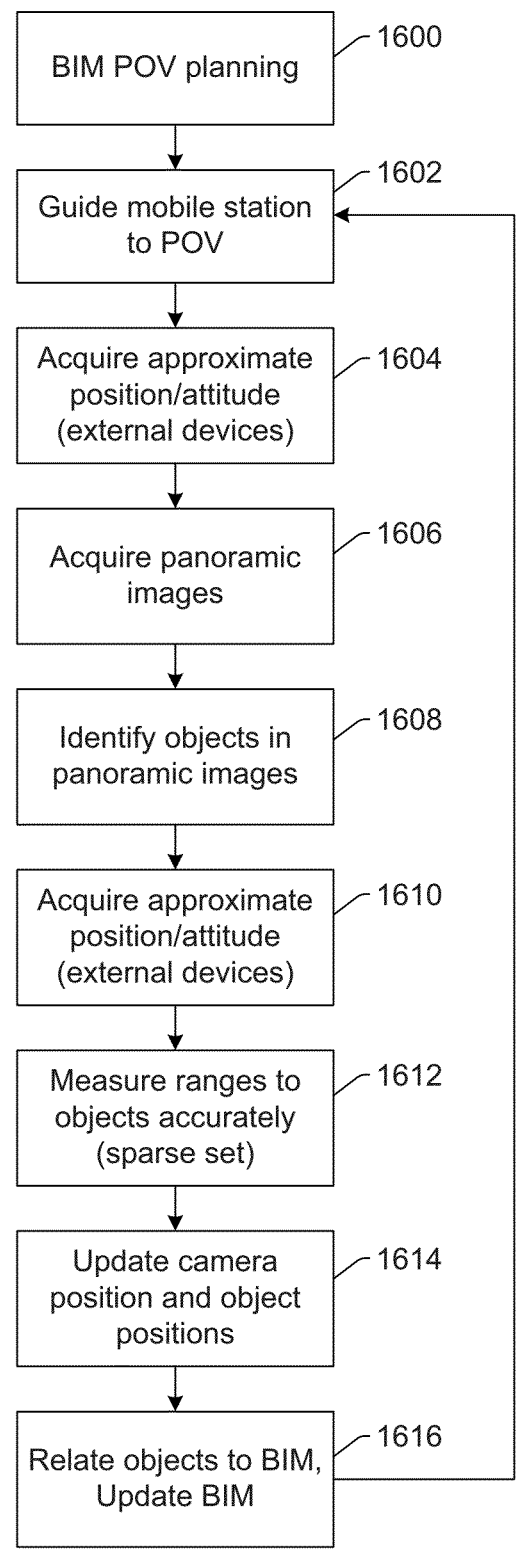
FIG. 16-18 are flow charts illustrating various embodiments of methods for acquiring information for a construction site.

One embodiment of a conceptual mobile station workflow is shown in FIG. 16. Each of the steps shown in FIG. 16 may be performed as described further herein. The method shown in FIG. 16 includes BIM POV planning (i.e., planning the POV of the base and/or measurement units based on the BIM), as shown in step 1600. The method also includes guiding the mobile station to its POV, as shown in step 1602. In addition, the method includes acquiring approximate position/attitude (external devices), as shown in step 1604. The method further includes acquiring panoramic images of the construction site, as shown in step 1606. The method also includes identifying objects in the panoramic images, as shown in step 1608. In addition, the method includes acquiring approximate position/attitude (external devices), as shown in step 1610. Furthermore, the method includes measuring ranges to objects accurately (sparse set), as shown in step 1612, and updating camera position and object positions, as shown in step 1614. In addition, the method includes relating objects to the BIM and/or updating the BIM, as shown in step 1616. Information about the objects related to the BIM and/or the updated BIM may be provided to step 1602 such that the information can be used to guide the mobile station to a new POV. The method shown in FIG. 16 may include any other step(s) described herein.

Figure 17:
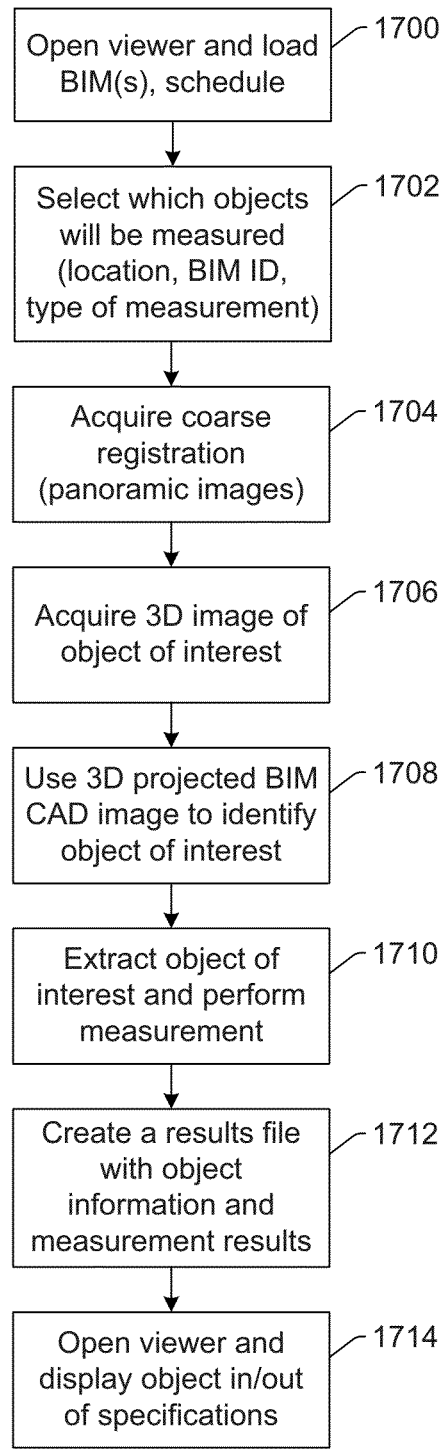

One embodiment of a QA use case is shown in FIG. 17. Each of the steps shown in FIG. 17 may be performed as described further herein. The method shown in FIG. 17 includes opening a viewer and loading BIM(s) and/or a schedule, as shown in step 1700. The method also includes selecting which objects will be measured and information about the measurements (such as object location, object BIM ID, and type of measurement), as shown in step 1702. In addition, the method includes acquiring coarse registration (e.g., via a panoramic image), as shown in step 1704. The method further includes acquiring a 3D image of the object of interest, as shown in step 1706. The method also includes using a 3D projected BIM CAD image to identify an object of interest, as shown in step 1708. In addition, the method includes extracting the object of interest and performing the measurement, as shown in step 1710. The method further includes creating a results file with the object information and measurement results, as shown in step 1712. Furthermore, the method includes opening a viewer and displaying the objects in and out of spec, as shown in step 1714. This method may include any other step(s) described herein.

Figure 18:
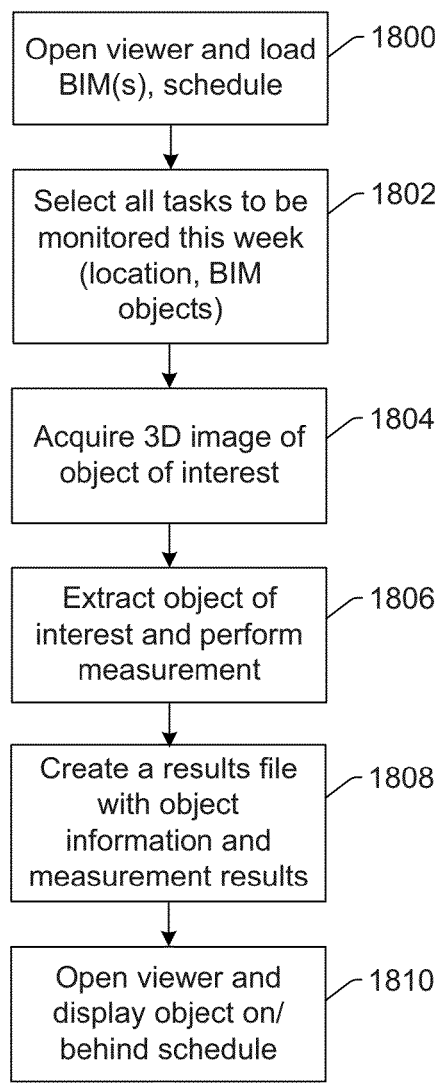

One embodiment of a PM use case is shown in FIG. 18. Each of the steps shown in FIG. 18 may be performed as described further herein. The method shown in FIG. 18 includes opening a viewer and loading BIM(s) and/or a schedule, as shown in step 1800. The method also includes selecting all tasks to be monitored this week or other time period (including location and BIM objects), as shown in step 1802. In addition, the method includes acquiring a 3D image of the object of interest, as shown in step 1804. The method further includes extracting the object of interest and performing the measurement, as shown in step 1806. The method further includes creating a results file with the object information and measurement results, as shown in step 1808. Furthermore, the method includes opening a viewer and displaying the objects on or behind schedule, as shown in step 1810. This method may include any other step(s) described herein.

Each of the embodiments of the methods described above may include any other step(s) of any other method(s)

described herein. Furthermore, each of the embodiments of the methods described above may be performed by any of the systems described herein.

All of the methods described herein may include storing results of one or more steps of the method embodiments in a non-transitory computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Figure 19:
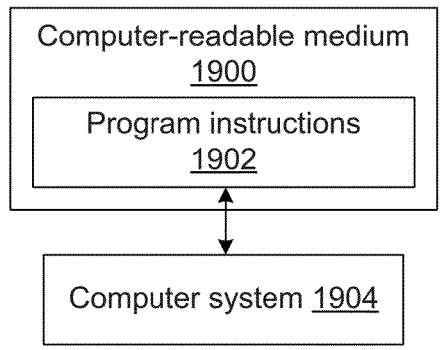
FIG. 19 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method described herein. One such embodiment is shown in FIG. 19. In particular, as shown in FIG. 19, non-transitory computer-readable medium 1900 includes program instructions 1902 executable on computer system 1904. The computer-implemented method includes any steps of any methods described above.

Program instructions 1902 implementing methods such as those described herein may be stored on computer-readable medium 1900. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ Objects, JavaBeans, Microsoft Foundation Classes ("MFC"), or other technologies or methodologies, as desired.

The computer system may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system may also include any suitable processor known in the art such as a parallel processor. In addition, the computer system may include a computer platform with high speed processing and software, either as a standalone or a networked tool. Any of the computer subsystems described herein may be configured in a similar manner.

Further modifications and alternative embodiments of various aspects of the invention will be apparent to those skilled in the art in view of this description. For example, methods and systems for acquiring information for a construction site are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to acquire information for a construction site, comprising:
a base unit positioned within the construction site by a user, wherein the base unit comprises an optical subsystem and a computer subsystem, and wherein the computer subsystem is configured to determine a position of the base unit with respect to the construction site; and
a measurement unit configured to be moved within the construction site by a user, wherein the measurement unit comprises one or more elements that are configured to interact with light in a known manner, wherein the optical subsystem of the base unit is configured to direct light to the one or more elements and detect the light after interacting with the one or more elements, wherein the computer subsystem of the base unit is configured to determine a position and pose of the measurement unit with respect to the base unit based on the detected light, and wherein the measurement unit comprises a measurement device configured to be used by the measurement unit or the base unit to determine information for the construction site.

2. The system of claim 1, wherein the computer subsystem is further configured to determine the position of the base unit with respect to the construction site by determining a position of the base unit with respect to a design for the construction site.

3. The system of claim 1, wherein the optical subsystem of the base unit comprises a multi-directional optical subsystem.

4. The system of claim 1, wherein the computer subsystem is further configured to determine the position of the base unit with respect to the construction site by using the optical subsystem of the base unit to identify two or more reference points having known positions within the construction site and determining the position of the base unit relative to the two or more reference points.

5. The system of claim 4, wherein the two or more reference points comprise two or more tags positioned in the construction site by the user.

6. The system of claim 5, wherein the two or more tags comprise passive elements.

7. The system of claim 5, wherein the two or more tags comprise active elements.

8. The system of claim 4, wherein the two or more reference points comprise fixed construction elements of the construction site.

9. The system of claim 4, wherein the computer subsystem of the base unit is further is configured to modify the two or more reference points over time based on changes in the construction site.

10. The system of claim 1, wherein the position of the measurement unit with respect to the base unit comprises a position of the measurement unit in three-dimensional coordinates, and wherein the pose of the measurement unit with respect to the base unit comprises an orientation of a point of view of the measurement unit.

11. The system of claim 1, wherein the measurement unit further comprises one or more sensors configured to determine the direction of gravity relative to a coordinate system of the measurement unit.

12. The system of claim 1, wherein the measurement unit further comprises one or more devices configured to determine an azimuth direction of the base unit in a coordinate system of the measurement unit.

13. The system of claim 1, wherein the one or more elements of the measurement unit comprise one or more reflective or partially reflective elements.

14. The system of claim 1, wherein the one or more elements of the measurement unit are passive elements.

15. The system of claim 1, wherein the one or more elements of the measurement unit are active elements.

16. The system of claim 1, wherein at least one of the one or more elements of the measurement unit has a curved surface that at least partially reflects the light directed by the base unit.

17. The system of claim 1, wherein the computer subsystem of the base unit is further configured to determine the position and pose of the measurement unit with respect to the base unit based on a shape of the tight of the base unit on at least one of the one or more elements of the measurement unit.

18. The system of claim 1, wherein the computer subsystem of the base unit is further configured to determine the position and pose of the measurement unit with respect to the base unit based on locations of multiple light beams directed by the optical subsystem of the base unit onto at least one of the one or more elements of the measurement unit.

19. The system of claim 1, wherein the measurement unit further comprises one or more sensors configured to detect the light from the optical subsystem of the base unit and one or more devices configured to send feedback to the base unit based on output from the one or more sensors such that the base unit can re-direct the light to the one or more elements of the measurement unit.

20. The system of claim 1, wherein the computer subsystem of the base unit is further configured to determine a position and pose of the measurement unit with respect to the base unit based on the detected light and information from the measurement unit.

21. The system of claim 1, wherein the information for the construction site comprises one or more characteristics of one or more construction elements of the construction site.

22. The system of claim 21, wherein the one or more characteristics comprise a presence or an absence of the one or more construction elements.

23. The system of claim 21, wherein the one or more characteristics comprise position, dimension, or some combination thereof of the one or more construction elements.

24. The system of claim 1, wherein the measurement device comprises a rod having a first end coupled to the measurement unit and a second end that is positioned by the user in contact with one or more construction elements for which the information is being determined, and wherein the rod has a predetermined, fixed length and orientation with respect to the measurement unit.

25. The system of claim 1, wherein the measurement device comprises a stereo camera configured to generate one or more images of one or more construction elements of the construction site.

26. The system of claim 1, wherein the measurement device comprises an illumination subsystem configured to direct structured illumination onto one or more construction elements of the construction site.

27. The system of claim 1, wherein the information for the construction site comprises one or more two-dimensional or three-dimensional images of one or more construction elements of the construction site.

28. The system of claim 1, wherein the measurement device comprises a two-dimensional camera, and wherein the information comprises a three-dimensional image of the construction site generated by the base unit or the measurement unit using two or more two-dimensional images generated by the two-dimensional camera.

29. The system of claim 1, wherein the measurement device comprises one or more three-dimensional ranging sensors, and wherein the information comprises three-dimensional data for the construction site generated based on output of the one or more three-dimensional ranging sensors.

30. The system of claim 1, wherein the measurement device comprises a single point scanner.

31. The system of claim 1, wherein the measurement device comprises a range sensor.

32. The system of claim 1, wherein the measurement unit further comprises a computer subsystem configured to display to the user on a display device of the measurement unit the information for the construction site with a design for the construction site.

33. The system of claim 1, wherein the construction site is a partially constructed building.

34. The system of claim 1, wherein the measurement unit or the base unit is further configured to use the information for the construction site to determine if one or more elements detected in the information are permanent construction elements or temporary elements.

35. The system of claim 1, wherein the measurement unit or the base unit is further configured to use the information for the construction site to correlate one or more elements detected in the information with one or more construction elements in a design for the construction site.

36. The system of claim 1, wherein the computer subsystem of the base unit, the measurement unit, or another computer subsystem is further configured to generate information about progress of the construction site based on the information for the construction site.

37. A method for acquiring information for a construction site, comprising:
determining a position of a base unit with respect to the construction site, wherein the base unit is positioned within the construction site by a user, and wherein the base unit comprises an optical subsystem and a computer subsystem;
directing light to one or more elements of a measurement unit using the optical subsystem of the base unit, wherein the one or more elements interact with the light in a known manner, and wherein the measurement unit is moved within the construction site by a user;
detecting the light after interacting with the one or more elements using the optical subsystem of the base unit;
determining a position and pose of the measurement unit with respect to the base unit based on the detected light using the computer subsystem of the base unit; and
determining information for the construction site using measurement device of the measurement unit.

* * * * *